United States Patent
Xin

(10) Patent No.: US 12,469,847 B2
(45) Date of Patent: Nov. 11, 2025

(54) DOPING STRATEGY FOR LAYERED OXIDE ELECTRODE MATERIALS USED IN SODIUM-ION BATTERIES

(71) Applicant: THE REGENTS OF THE UNIVERSITY OF CALIFORNIA, Oakland, CA (US)

(72) Inventor: Huolin Xin, Irvine, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 152 days.

(21) Appl. No.: 18/340,761

(22) Filed: Jun. 23, 2023

(65) Prior Publication Data
US 2023/0352672 A1    Nov. 2, 2023

Related U.S. Application Data

(63) Continuation-in-part of application No. 17/358,370, filed on Jun. 25, 2021, now abandoned.

(60) Provisional application No. 63/044,099, filed on Jun. 25, 2020.

(51) Int. Cl.
| | | |
|---|---|---|
| H01M 4/505 | (2010.01) | |
| C01G 53/50 | (2025.01) | |
| H01M 4/131 | (2010.01) | |
| H01M 4/525 | (2010.01) | |
| H01M 10/054 | (2010.01) | |

(52) U.S. Cl.
CPC ............ *H01M 4/505* (2013.01); *C01G 53/50* (2013.01); *H01M 4/131* (2013.01); *H01M 4/525* (2013.01); *H01M 10/054* (2013.01); *C01P 2002/52* (2013.01); *C01P 2002/72* (2013.01); *C01P 2002/77* (2013.01); *C01P 2002/85* (2013.01); *C01P 2002/90* (2013.01); *C01P 2004/03* (2013.01); *C01P 2004/04* (2013.01); *C01P 2006/40* (2013.01)

(58) Field of Classification Search
None
See application file for complete search history.

(56) References Cited

U.S. PATENT DOCUMENTS

| | | |
|---|---|---|
| 7,488,465 B2 | 2/2009 | Eberman et al. |
| 2006/0046142 A1 | 3/2006 | Kasai et al. |
| 2010/0015493 A1 | 1/2010 | Adachi et al. |
| 2017/0072089 A1 | 3/2017 | Nseir Manassa et al. |
| 2017/0317352 A1 | 11/2017 | Lee et al. |
| 2018/0145370 A1 | 5/2018 | Buisine et al. |
| 2019/0103627 A1 | 4/2019 | Freigang et al. |
| 2020/0127324 A1 | 4/2020 | Ryu et al. |
| 2020/0153041 A1 | 5/2020 | Ryu et al. |
| 2020/0168911 A1 | 5/2020 | Kim et al. |
| 2021/0083317 A1 | 3/2021 | Yang et al. |
| 2021/0143475 A1 | 5/2021 | Mokrini et al. |
| 2022/0336802 A1 | 10/2022 | Xin |
| 2022/0336804 A1 | 10/2022 | Xin |
| 2022/0371911 A1* | 11/2022 | Wang et al. .......... H01M 4/505 |

FOREIGN PATENT DOCUMENTS

| | | |
|---|---|---|
| CN | 1870330 A | 11/2006 |
| CN | 1893151 A | 1/2007 |
| CN | 101295780 A | 10/2008 |
| CN | 101944610 A | 1/2011 |
| CN | 102631875 A | 8/2012 |
| CN | 103280576 A | 9/2013 |
| CN | 104253265 A | 12/2014 |
| CN | 105810931 A | 7/2016 |
| CN | 107845786 A | 3/2018 |
| CN | 110474035 A | 11/2019 |
| CN | 111326734 A | 6/2020 |
| CN | 112103496 A | 12/2020 |
| CN | 112331840 A | 2/2021 |
| CN | 112750999 A | 5/2021 |
| JP | 10-241691 A | 9/1998 |
| JP | 2014229452 A | 12/2014 |
| WO | 2012/086273 A1 | 6/2012 |
| WO | 2014/136760 A1 | 9/2014 |
| WO | 2016/107237 A1 | 7/2016 |

(Continued)

OTHER PUBLICATIONS

Yuan et al. Synthesis and electrochemical behaviors of layered Na0.67[Mn0.65Co0.2Ni0.15]O2 microflakes as a stable cathode material for sodium-ion batteries. J. Mater. Chem. A, 1, 3895-3899 (Year: 2013).*
Li et al. "Designing an advanced P2-Na 0.67 Mn 0.65 Ni 0.2 Co 0.15 O 2 layered cathode material for Na-ion batteries." Journal of Materials Chemistry A 3.31 (2015): 16272-16278.
WIPO, "International Search Report and Written Opinion" issued in connection with PCT Patent Application PCT/US2023/069170, dated Feb. 7, 2024, 11 pages.
Mindemark et al., "Beyond PEO—Alternative Host Materials For Li+-Conducting Solid Polymer Electrolytes", Progress in Polymer Science 81, 2018, pp. 114-143.

(Continued)

*Primary Examiner* — Tanisha Diggs
(74) *Attorney, Agent, or Firm* — NGUYEN TARBET IP LAW

(57) ABSTRACT

The present invention features a new way of doping layered cathode materials in sodium-ion batteries. Using a "high entropy" doping strategy, more than four impurity elements can be introduced to the host materials. The present invention applies this high entropy doping strategy to a sodium cathode material. This new high entropy doping strategy allows the layered oxide materials used in the positive electrode of sodium ion battery to achieve higher charge/discharge rate (i.e. capacity retention is better at high discharge rate), long life cycle and reduced reliance on the expensive and toxic cobalt, all of which are desired attributes for improving the performance of sodium ion batteries and reducing their cost.

7 Claims, 19 Drawing Sheets
(18 of 19 Drawing Sheet(s) Filed in Color)

(56) References Cited

FOREIGN PATENT DOCUMENTS

WO           2020/264461 A1      12/2020
WO      WO-2021175233 A1 *       9/2021    ......... C01G 45/1228

OTHER PUBLICATIONS

Khurana et al., "Suppression Of Lithium Dendrite Growth Using Cross-Linked Polyethylene/Poly(Ethylene Oxide) Electrolytes: A New Approach For Practical Lithium-Metal Polymer Batteries", Journal Of The American Chemical Society, vol. 136, 2014, pp. 7395-7402.

Alarco et al., "The Plastic-Crystalline Phase Of Succinonitrile As A Universal Matrix For Solid-State Ionic Conductors", Nature Materials, vol. 3, Jun. 13, 2004, pp. 476-481.

Croce et al., "Nanocomposite Polymer Electrolytes For Lithium Batteries", Nature, vol. 394, Jul. 30, 1998, pp. 456-458.

Borodin et al., "Uncharted Waters: Super-Concentrated Electrolytes", Joule, vol. 4, Jan. 15, 2020, pp. 69-100.

Hu et al., "Progress In Nitrile-Based Polymer Electrolyte For High Performance Lithium Batteries", Journal of Materials Chemistry A, 2016, pp. 10070-10083.

Angell et al., "Rubbery Solid Electrolytes With Dominant Cationic Transport And High Ambient Conductivity", Letters To Nature, vol. 362, Mar. 11, 1993, pp. 137-139.

Wang et al., "Solid-State Rigid-Rod Polymer Composite Electrolytes With Nanocrystalline Lithium Ion Pathways", Nature Materials, vol. 20, Sep. 2021, pp. 1255-1263.

Li et al., "A Superionic Conductive, Electrochemically Stable Dual-Salt Polymer Electrolyte", Joule, vol. 2, Sep. 19, 2018, pp. 1838-1856.

Cui, Guanglei, "Reasonable Design of High-Energy-Density Solid-State Lithium-Metal Batteries", Matter, vol. 2, Apr. 1, 2020, pp. 805-815.

Lin et al., "A Silica-Aerogel-Reinforced Composite Polymer Electrolyte With High Ionic Conductivity and High Modulus", Composite Polymer Electrolytes, vol. 30, 2018, 8 pages.

Lopez et al., "Designing Polymers For Advanced Battery Chemistries", Reviews, vol. 4, May 2019, pp. 312-330.

Yue et al., "All Solid-State Polymer Electrolytes For High-Performance Lithium Ion Batteries", Energy Storage Materials, vol. 5, Jul. 21, 2016, pp. 139-164.

Lee et al., "Elastomeric Electrolytes For High-Energy Solid-State Lithium Batteries", Nature, vol. 601, Jan. 12, 2022, pp. 217-222.

WIPO, "International Preliminary Report on Patentability" issued in connection with PCT Patent Application PCT/US2023/069170, dated Jan. 9, 2025, 8 pages.

Yu et al. "Mitigating Voltage And Capacity Fading Of Lithium-Rich Layered Cathodes By Lanthanum Doping", Journal of Power Sources, vol. 335, 2016, pp. 65-75.

Zheng et al., "Host Structural Stabilization Of Li1.232Mn0.615Ni0.154O2 Through K-Doping Attempt: Toward Superior Electrochemical Performances", Electrochimica Acta, vol. 188, 2016, pp. 336-343.

Zhang et al., "Compositionally Complex Doping For Zero-Strain Zero-Cobalt Layered Cathodes", Nature, 2022, pp. 57-73.

WIPO, "International Search Report and Written Opinion" issued in connection with PCT Patent Application PCT/US2022/35007, dated Jan. 6, 2023, 14 pages.

WIPO, "International Preliminary Report on Patentability" issued in connection with PCT Patent Application PCT/US2022/035007, dated Jan. 4, 2024, 10 pages.

Wang et al., "Lithium Containing Layered High Entropy Oxide Structures", Scientific Reports, vol. 10, No. 18430, 2020, 13 pages.

USPTO, "Non-Final Office Action", issued in connection with U.S. Appl. No. 17/358,370 dated Mar. 23, 2023, 8 pages.

EPO, "Partial Supplementary European Search Report" issued in connection with EP Patent Application 22829440.1, dated Aug. 7, 2025, 19 pages.

\* cited by examiner

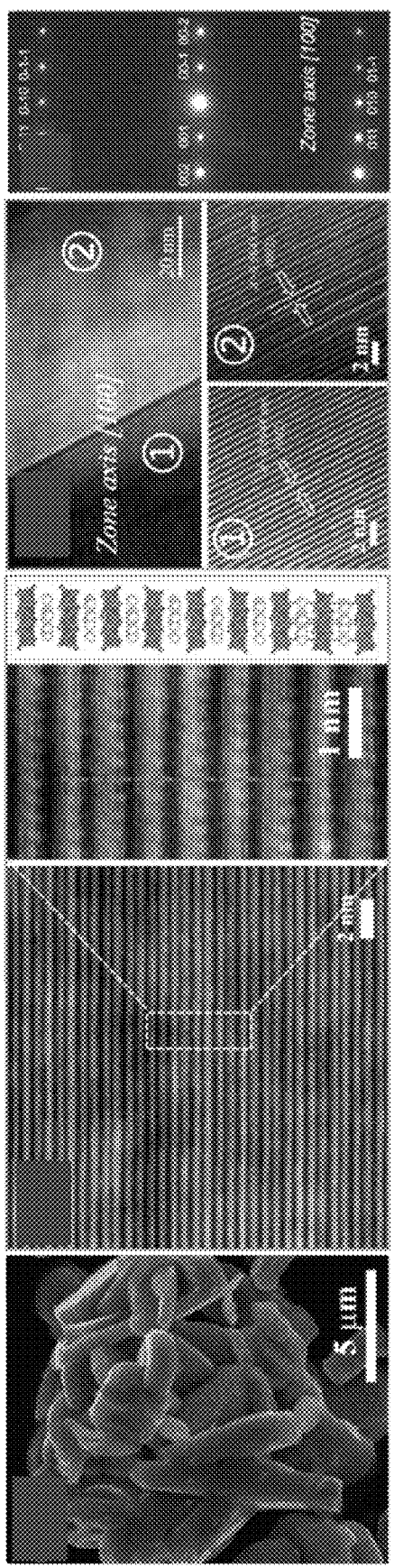
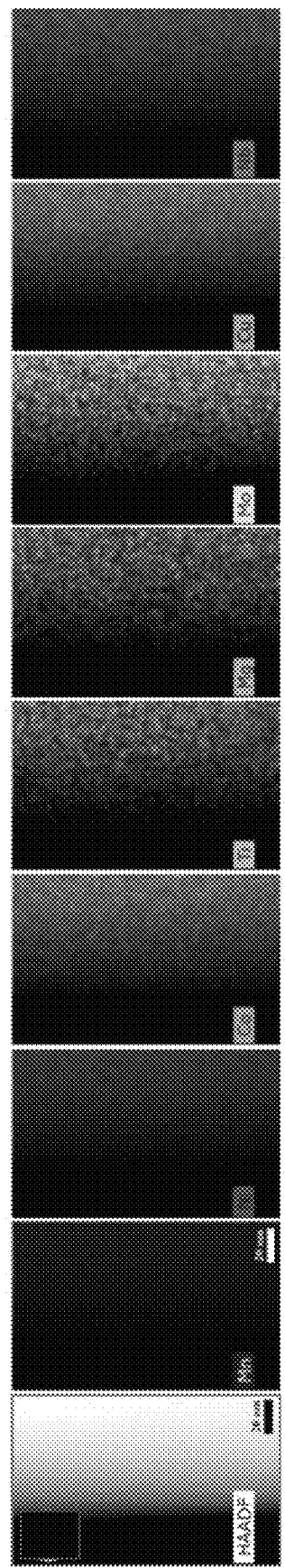

FIG. 4A
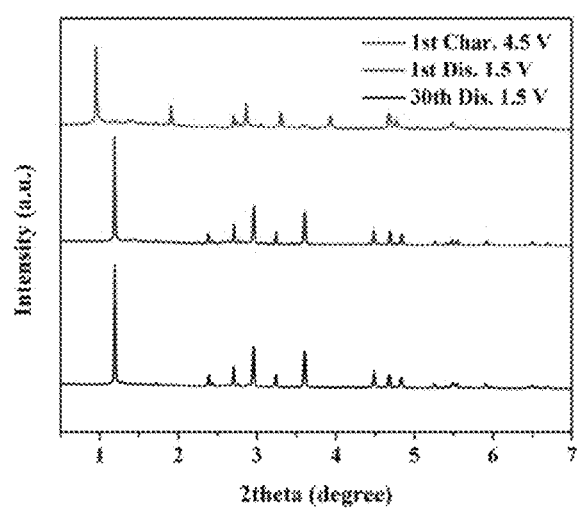
FIG. 4B
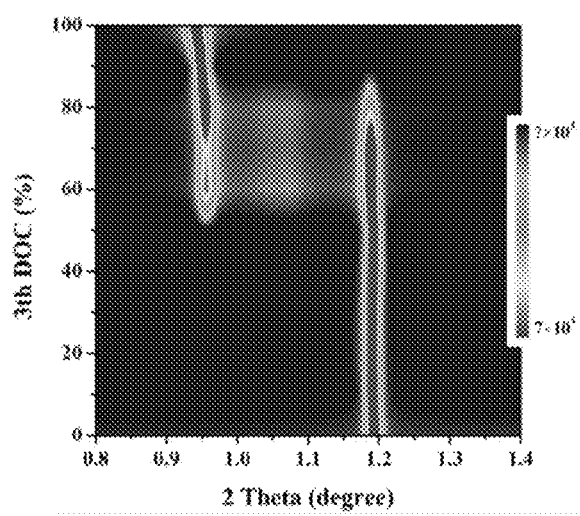
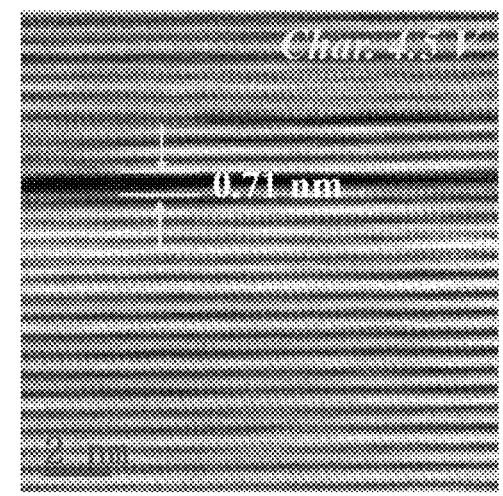
FIG. 4C
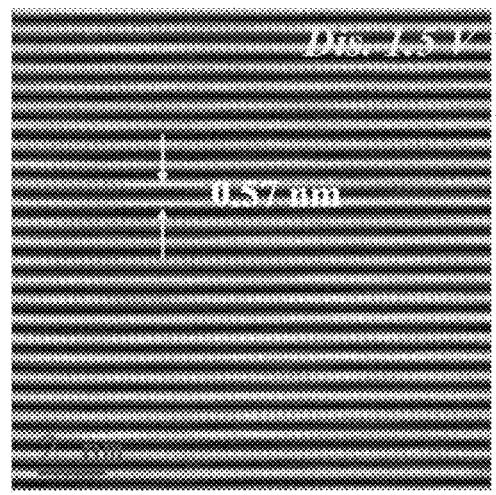
FIG. 4D

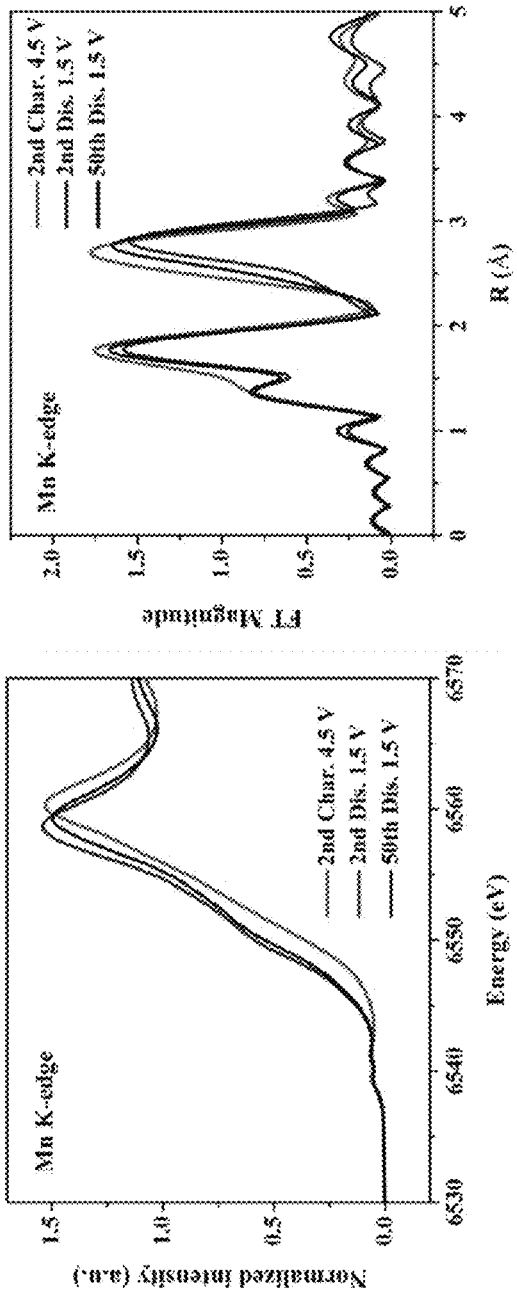
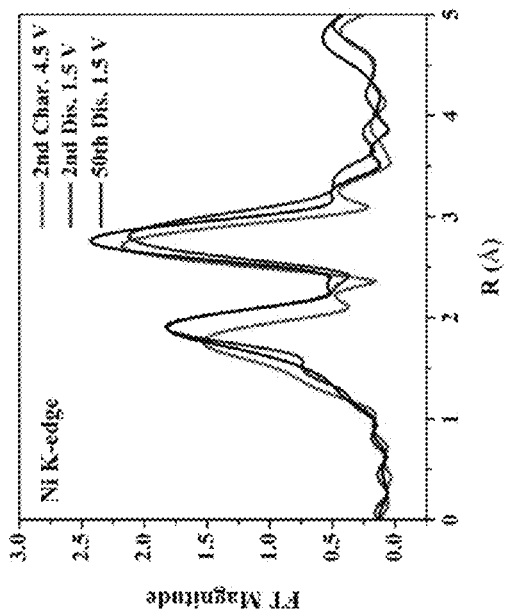
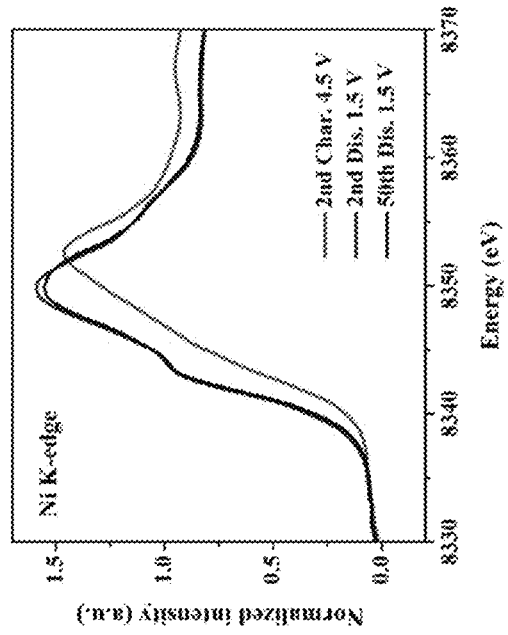

FIG. 13A
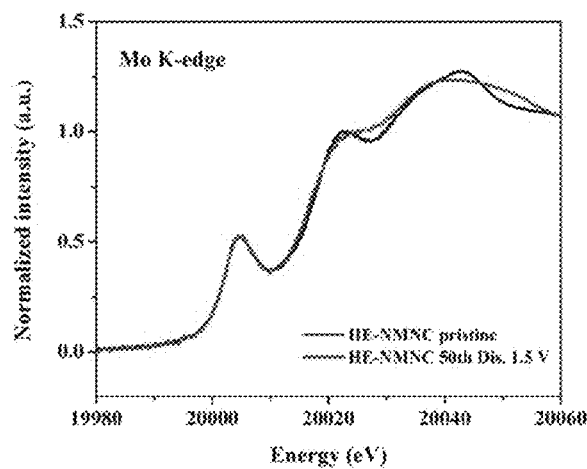
FIG. 13B
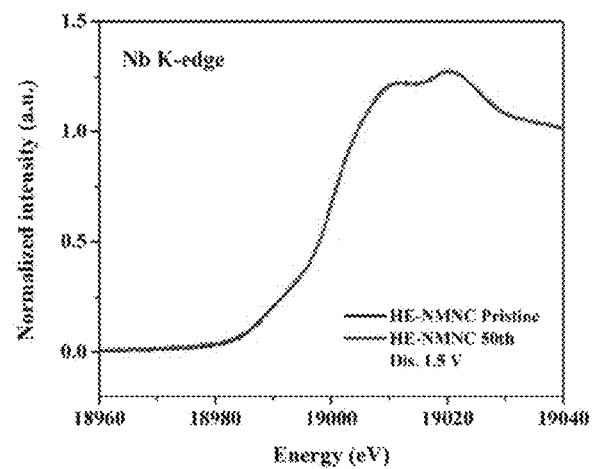
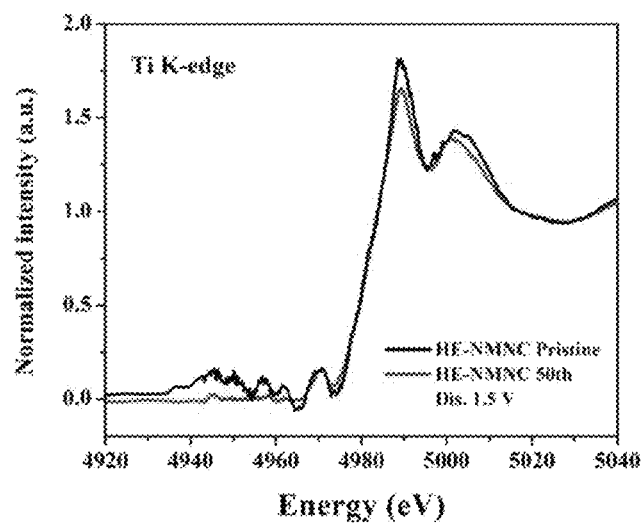
FIG. 13C

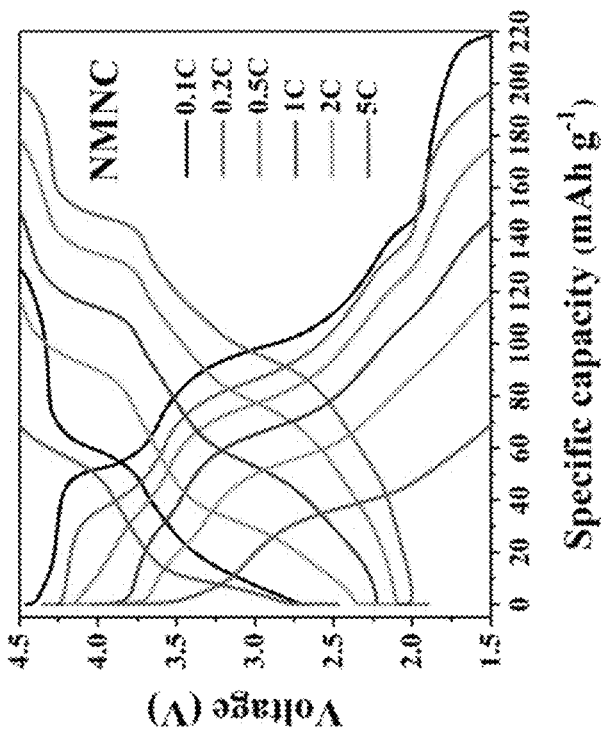
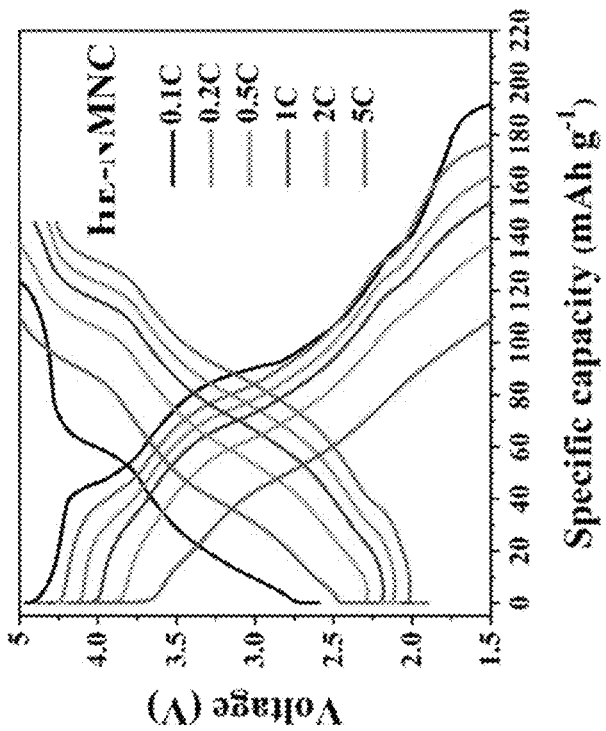
FIG. 18A
FIG. 18B

DOPING STRATEGY FOR LAYERED OXIDE ELECTRODE MATERIALS USED IN SODIUM-ION BATTERIES

CROSS-REFERENCES TO RELATED APPLICATIONS

This application is a continuation-in-part and claims benefit of U.S. application Ser. No. 17/358,370 filed Jun. 25, 2021, which claims benefit of U.S. Provisional Application No. 63/044,099 filed Jun. 25, 2020, the specification(s) of which is/are incorporated herein in their entirety by reference.

FIELD OF THE INVENTION

The present invention relates to a composition for a new positive electrode material more particularly to a composition used in a sodium ion battery that has a high energy density and long life cycle.

BACKGROUND OF THE INVENTION

Lithium-ion battery technology has been proven a viable technology for powering portable devices and vehicles. However, lithium (Li) is a critical material because it is sourced from only a handful of countries, and it is difficult to recycle Li. On the other hand, sodium (Na), an element that can be found in table salt, is not only earth abundant but also widely available, not to mention its price is much lower than Li. However, the problem with Na-ion batteries is three-fold: 1) the cathode materials are low in specific capacity (i.e. capacity/gram); 2) The cathode materials' rate performance is not good, i.e., less charge can be extracted when operating at power regimes; and 3) The life cycle is not satisfactory. All these make Na-ion battery technology less competitive than Li-ion batteries.

The search for better cathode materials is non-stop. In FIG. 1 published in Adv. Funct. Mater. 2020, 1909530, all the chemistries and structures of potentially useful Na-ion cathode materials have been summarized. To be comparative with Li-ion battery technology, cell manufacturers would be interested in those materials that has a specific capacity higher than 160 mAh/g—for example O3-Na$(Mn_{0.25}Ni_{0.25}Fe_{0.25}Mg_{0.25})O_2$, P2-$Na_{2/3}Fe_{1/2}Mn_{1/2}O_2$, O3-$NaFe_{0.5}Co_{0.5}O_2$, O3-$Na[Ni_{0.32}Fe_{0.12}Co_{0.15}Mn_{0.40}]O_2$, O2-$Na_{5/6}[Li_{1/4}Mn_{3/4}]O_2$, P2-$Na_{2/3}[Mg_{0.28}Mn_{0.72}]O_2$. The field has been trying to find new chemistries that have higher specific capacity by exhaustive search.

Recently, low-cost element Titanium (Ti), Molybdenum (Mo), Zinc (Zn) and the more expensive element Niobium (Nb), Yttrium (Y), Zirconium (Zr), Scandium (Sc), Vanadium (V), and Chromium (Cr) can stabilize the surface rock salt layer for Nickel (Ni—), Manganese (Mn—), and Cobalt (Co—) containing layered oxides. These elements can improve oxygen retention on the surface of layered oxides. Furthermore, Yttrium (Y), Boron (B), Magnesium (Mg), Titanium (Ti), Tungsten (W), Antimony (Sb), Tantalum (Ta), and Aluminum (Al) can also improve the thermal stability of $LiNiO_2$ and in principle have oxygen retaining effects in layer oxide. However, it is difficult to use a single dopant to acquire the desired oxygen retention effect.

A second consideration is based on reducing strain and impeding the development of defects in the layered material particularly when they are charged to high voltages. During that charging process, lithium is extracted from the cathode material, undesired strain and defects are developed due to volume change and phase transition.

BRIEF SUMMARY OF THE INVENTION

It is an objective of the present invention to provide a composition for a new positive electrode material used in sodium ion batteries that allows for a high energy density and long life cycle, as specified in the independent claims. Embodiments of the invention are given in the dependent claims. Embodiments of the present invention can be freely combined with each other if they are not mutually exclusive.

In some aspects, the present invention features a composition used in the cathode for a sodium ion battery. In some embodiments, the composition may be represented by a formula $Na_aMn_bNi_cCo_dD1x_1D2x_2 \ldots Dnx_nO_2$. In some embodiments, a ranges from about 0.6 to 0.7, b ranges from about 0.6 to 0.7, c ranges from about 0.1 to 0.2, and d ranges from about 0.1 to 0.15. In some embodiments, n is greater than or equal to 4 and $x_i$ ranges from about 0.001 to 0.65 and satisfies the following equation $\Sigma_{i-1}^n x_i = 1-b-c-d$. In some embodiments, the respective proportions of the elements in the compositions may vary by plus or minus 10%.

In some embodiments, $D1x_1D2x_2 \ldots Dnx_n$ are impurity doping elements that are different from each other and from Mn, Ni, and Co. In some embodiments, D1, D2, . . . , Dn are each selected from the following elements: Ti, Mg, Mo, Nb, Al, Zr, Cr, V, Y, Sc, B, W, Sb, Cu, Ta, Al, Li, Mg, Si, Ca, Sr, Ba, Zn, V, Fe, Cr, Nd, LA, Ga, Sb, Ce, Tc, Ru, Rh, Ag, Cd, Ge, Pt, Au, Sn, F, Cl, Br, I, O, S, P, and N. In some embodiments, $x_i$ may be the same for each one of D1, D2, . . . , Dn. In other embodiments, $x_i$ may be different for each one of D1, D2, . . . , Dn. In a non-limiting embodiment, the composition may comprise $Na_{0.667}Mn_{0.666}Ni_{0.167}Co_{0.107}Ti_{0.01}Mg_{0.01}Mo_{0.01}Nb_{0.01}Cu_{0.01}O_{2.2}$.

One of the unique and inventive technical features of the present invention is the use of sodium (Na) in the positive electrode material. Without wishing to limit the invention to any theory or mechanism, it is believed that the use of Na in the positive electrode material of the present invention advantageously provides for the use of an element that is more highly abundant and easier to acquire. Additionally, there are more elements that can be used in large quantities with Na as compared to Li. Furthermore, the use of Na opens up the use of different crystal structure phases such as P2 and P3. None of the presently known prior references or work has the unique inventive technical feature of the present invention.

Moreover, the prior references teach away from the present invention because Li is preferred over Na-ion batteries, which have several problems associated with their use. For example, Li is already commonly used in the layered oxide material therefore it already has all the supply chain infrastructure set up whereas Na has none. Li also makes a majority of the market share as compared to Na.

Furthermore, the inventive technical features of the present invention contributed to a surprising result. For example, the sodium-ion cathode material developed here has a specific capacity (i.e. capacity per unit weight of the materials) that is comparable to the state-of-the-art cathode materials used in lithium-ion batteries. Also, it was surprising that the cycling stability of sodium-ion battery cathode materials could be improved by trace doping the materials with multiple different elements.

Another unique and inventive technical feature of the present invention is that it provides novel compositions of high entropy metal alloys (an alloy that has more than four metal elements) with improved mechanical properties. Without wishing to limit the invention to any particular theory or mechanism, local ordering (or compositional heterogeneity at the nanoscale) could frustrate the material and block the development of defects and dislocations like precipitates does traditional alloys. The novel compositions of the present invention may allow for high entropy doping in layered oxide that could block unwanted structural transformation during charging/discharging.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIGS. 2A-2H shows the Rietveld refinement XRD plot of different cathodes (FIG. 2A) NMNC, (FIG. 2B) HE-NMNC, (FIG. 2C) crystal structure illustrations of P2-type materials, (FIG. 2D) SEM image of HE-NMNC, (FIG. 2E) HR-STEM images of HE-NMNC, (FIG. 2F) HR-TEM images of HE-NMNC, (FIG. 2G) SAED of HE-NMNC, (FIG. 2H) STEM-EDS results of HE-NMNC.

FIGS. 4A-4D show the (FIG. 4A) Ex-situ XRD of HE-NMNC in different (dis-) charge states, (FIG. 4B) Ex-situ XRD of HE-NMNC in the third charging process, (FIG. 4C) HADDF-STEM image of HE-NMNC at first cycle when charging to 4.5 V, (FIG. 4D) HADDF-STEM image of HE-NMNC at first cycle when charging to 1.5 V.

FIGS. 9A-9B show the Ex-situ XAS spectra of HE-NMNC at the 2nd and 50th cycles (FIG. 9A) Mn XANES, (FIG. 9B) Mn EXAFS.

FIGS. 10A-10B show the Ex-situ XAS spectra of HE-NMNC at the 2nd and 50th cycles (FIG. 10A) Ni XANES, (FIG. 10B) Ni EXAFS.

FIGS. 13A-13C shows the Ex-situ XANES spectra of HE-NMNC at different cycles (FIG. 13A) Mo K-edge, (FIG. 13B) Nb K-edge, (FIG. 13C) Ti K-edge.

FIGS. 18A-18B shows the corresponding (dis-) charge curves of materials at various C-rate, (FIG. 18A) HE-NMNC, (FIG. 18B) NMNC.

DETAILED DESCRIPTION OF THE INVENTION

Figure 1:
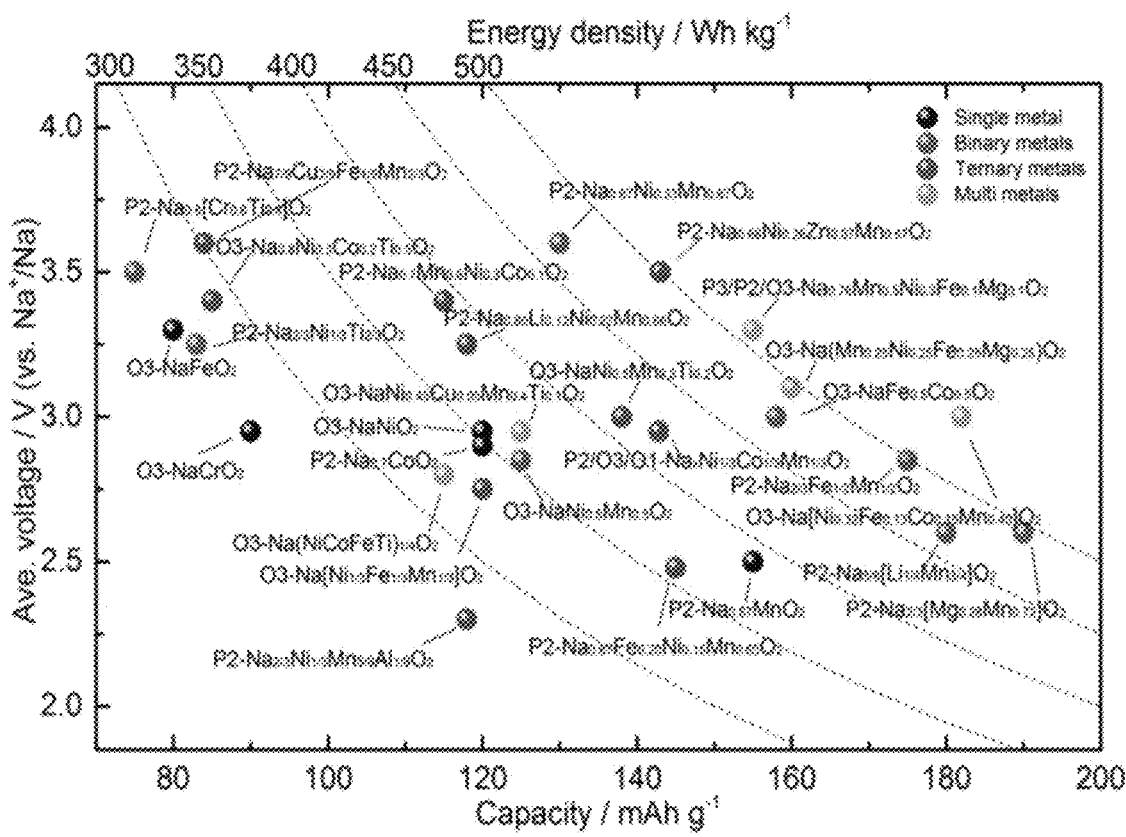
FIG. 1 shows the state-of-the-art cathode materials for sodium-ion batteries.

For purposes of summarizing the disclosure, certain aspects, advantages, and novel features of the disclosure are described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Additionally, although embodiments of the disclosure have been described in detail, certain variations and modifications will be apparent to those skilled in the art, including embodiments that do not provide all the features and benefits described herein. It will be understood by those skilled in the art that the present disclosure extends beyond the specifically disclosed embodiments to other alternative or additional embodiments and/or uses and obvious modifications and equivalents thereof. Moreover, while a number of variations have been shown and described in varying detail, other modifications, which are within the scope of the present disclosure, will be readily apparent to those of skill in the art based upon this disclosure. It is also contemplated that various combinations or sub combinations of the specific features and aspects of the embodiments may be made and still fall within the scope of the present disclosure. Accordingly, it should be understood that various features and aspects of the disclosed embodiments can be combined with or substituted for one another in order to form varying modes of the present disclosure. Thus, it is intended that the scope of the present disclosure herein disclosed should not be limited by the particular disclosed embodiments described herein.

As used herein, the terms "high-entropy doping strategy" or "cocktail doping strategy" may refer to a method that allows a minimum of four impurity elements to be introduced into the host materials.

As used herein, the term "host materials" may refer to any layered cathode material.

As used herein, the term "discharge capacity" is a measure of the rate at which a battery is discharged relative to its maximum capacity and is a key feature that can reflect the health of a battery. It is often expressed as a C-rate in order to normalize against battery capacity, which is often very different between batteries. A C-rate is a measure of the rate at which a battery is discharged relative to its maximum capacity. A 1 C rate means that the discharge current will discharge the entire battery in 1 hour. A low C-rate may be below about 0.5 C. A high C-rate may be greater than or equal to about 1 C.

As used herein, the term "capacity retention" may refer to a measure of the ability of a battery to retain stored energy during an extended open-circuit rest period. In some embodiments the capacity retention is the remaining capacity after a period of storage of a fully charged battery or battery pack.

As used herein, the terms "capacity fading" or "capacity loss" may refer to a phenomenon observed in rechargeable battery usage where the amount of charge a battery can deliver at the rated voltage decreases with use.

As used herein, the term "impedance development" may refer to the increase of ionic/electronic resistance.

Referring to the figures, the present invention features a composition for a new positive electrode material, more particularly, to a composition used in a sodium ion battery that has a high energy density and long life cycle.

According to some embodiments, the composition may be represented by a formula $Na_aMn_bNi_cCo_dD1x_1D2x_2 \ldots Dnx_nO_2$. In some embodiments, a ranges from about 0.6 to 0.7; b ranges from about 0.6 to 0.7; c ranges from about 0.1 to 0.2; and d ranges from about 0.1 to 0.15. In some embodiments, $D1x_1D2x_2 \ldots Dnx_n$ are impurity doping elements that are different from each other and from Mn, Ni, and Co. In some embodiments, n is greater than or equal to 4 and xi ranges from about 0.001 to 0.65 and satisfies the following equation $\Sigma_{i=1}^{n} x_i=1\text{-b-c-d}$. In some embodiments, the respective proportions of the elements in the compositions may vary by plus or minus 10%.

In some embodiments, D1, D2, ..., Dn are each selected from the following elements: Ti, Mg, Mo, Nb, Al, Zr, Cr, V, Y, Sc, B, W, Sb, Cu, Ta, Al, Li, Mg, Si, Ca, Sr, Ba, Zn, V, Fe, Cr, Nd, LA, Ga, Sb, Ce, Tc, Ru, Rh, Ag, Cd, Ge, Pt, Au, Sn, F, Cl, Br, I, O, S, P, and N. In some embodiments, $x_i$ may be the same for each one of D1, D2, ..., Dn. In other embodiments, $x_i$ may be different for each one of D1, D2, ..., Dn.

In other embodiments, the composition may be used in a cathode or an anode for a battery. In preferred embodiments, the battery is a sodium ion or a sodium metal battery or a sodium-lithium hybrid battery.

According to other embodiments, the composition is represented by a formula $Na_aMn_bNi_cCo_dD1x_1D2x_2D3x_3D4x_4D5x_5O_2$. In preferred embodiments, the ratios of the elements may be the following: a ranges from about 0.6 to 0.7; b ranges from about 0.6 to 0.7; c ranges from about 0.1 to 0.2; and d ranges from about 0.1 to 0.15. In some embodiments, D1, D2, D3, D4, D5 are impurity doping elements that are different from each other and from Mn, Ni, and Co. In some embodiments, the composition comprises at least 4, or up to and including 5 of the impurity doping elements. and wherein xi ranges from about 0.00 to 0.65 and satisfies the following equation $\Sigma_{i=1}^{n} x_i=1\text{-b-c-d}$. In some embodiments, the respective proportions of the elements in the compositions may vary by plus or minus 10%.

In some embodiments, D1, D2, D3, D4, and D5 are each selected from the following elements: Ti, Mg, Mo, Nb, Al, Zr, Cr, V, Y, Sc, B, W, Sb, Cu, Ta, Al, Li, Mg, Si, Ca, Sr, Ba, Zn, V, Fe, Cr, Nd, LA, Ga, Sb, Ce, Tc, Ru, Rh, Ag, Cd, Ge, Pt, Au, Sn, F, Cl, Br, I, O, S, P, N. In some embodiments, the xi is the same for D1, D2, D3, D4, and D5. In other embodiments, xi is different for D1, D2, D3, D4, and D5.

In other embodiments, the composition may be used in a cathode or an anode for a battery. In preferred embodiments, the battery is a sodium ion or a sodium metal battery or a sodium-lithium hybrid battery.

In some embodiments, the composition is represented by a formula $Na_aMn_bNi_cCo_dTi_eMg_fMo_gNb_hCu_iO_j$. In preferred embodiments, the composition with the formula $Na_aMn_bNi_cCo_dTi_eMg_fMo_gNb_hCu_iO_j$ comprises ratios of elements in a range of: a from about 0.6 to 0.7; b from about 0.6 to 0.7; c from about 0.1 to 0.2; d from about 0.1 to 0.15; e from about 0.005 to 0.02; f from about 0.005 to 0.02; g from about 0.005 to 0.02; h from about 0.005 to 0.02; i from about 0.005 to 0.02; and j from about 1.9 to 2.1. In preferred embodiments, the composition is represented by a formula $Na_{0.667}Mn_{0.666}Ni_{0.167}Co_{0.107}Ti_{0.01}Mg_{0.01}Mo_{0.01}Nb_{0.01}Cu_{0.01}O_2$.

In other embodiments, the composition with the formula $Na_aMn_oNi_cCo_dTi_eMg_fMo_gNb_hCu_iO_j$ reaches a discharge capacity of 195 mhA/g at a low C-rate. In some embodiments, the composition with the formula $Na_aMn_bNi_cCo_dTi_eMg_fMo_gNb_hCu_iO_j$ reaches a discharge capacity of 180 mhA/g at a high C-rate. In one embodiment, the composition with the formula $Na_aMn_bNi_cCo_dTi_eMg_fMo_gNb_hCu_iO_j$ reaches a discharge capacity of 120 mhA/g at a C-rate of 5 C.

In other embodiments, the composition with the formula $Na_aMn_bNi_cCo_dTi_eMg_fMo_gNb_hCu_iO_j$ has slow capacity fading. In other embodiments, the composition with the formula $Na_aMn_bNi_cCo_dTi_eMg_fMo_gNb_hCu_iO_j$ has slow impedance development.

Non-limiting examples of the composition in accordance with the formula(s) are listed in the table below. It is to be understood that the present invention is not to be limited to said examples, and that other formulations are within the scope of the invention.

| Composition Formula(s) |
| --- |
| $Na_{0.667}Mn_{0.667}Ni_{0.167}Co_{0.117}Ti_{0.01}Mg_{0.01}Cu_{0.01}Mo_{0.01}Nb_{0.01}O_2$ |
| $Na_{0.667}Mn_{0.667}Ni_{0.168}Co_{0.117}Ti_{0.01}Mg_{0.01}Mo_{0.01}Nb_{0.01}O_2$ |
| $Na_{0.667}Mn_{0.667}Ni_{0.168}Co_{0.117}Ti_{0.01}Mg_{0.01}Cu_{0.01}Nb_{0.01}O_2$ |
| $Na_{0.667}Mn_{0.667}Ni_{0.168}Co_{0.117}Ti_{0.01}V_{0.01}Mo_{0.01}Nb_{0.01}O_2$ |
| $Na_{0.667}Mn_{0.667}Ni_{0.168}Co_{0.117}Ti_{0.01}Zr_{0.01}Mo_{0.01}Nb_{0.01}O_2$ |
| $Na_{0.667}Mn_{0.667}Ni_{0.168}Co_{0.117}Ti_{0.01}Sb_{0.01}Mo_{0.01}Nb_{0.01}O_2$ |
| $Na_{0.667}Mn_{0.667}Ni_{0.168}Co_{0.117}Ta_{0.01}Sb_{0.01}Mo_{0.01}Nb_{0.01}O_2$ |
| $Na_{0.667}Mn_{0.667}Ni_{0.168}Co_{0.117}Ta_{0.01}Sb_{0.01}Mg_{0.01}Nb_{0.01}O_2$ |
| $Na_{0.667}Mn_{0.667}Ni_{0.168}Co_{0.117}Ta_{0.01}Sb_{0.01}Y_{0.01}Nb_{0.01}O_2$ |
| $Na_{0.667}Mn_{0.667}Ni_{0.168}Co_{0.117}Ta_{0.01}Sb_{0.01}Y_{0.01}Al_{0.01}O_2$ |
| $Na_{0.667}Mn_{0.667}Ni_{0.168}Co_{0.117}Cr_{0.01}Sb_{0.01}Y_{0.01}Al_{0.01}O_2$ |
| $Na_{0.667}Mn_{0.667}Ni_{0.167}Co_{0.117}Cr_{0.01}V_{0.01}Al_{0.01}Sb_{0.01}Zn_{0.01}O_2$ |
| $Na_{0.667}Mn_{0.667}Ni_{0.167}Co_{0.117}Cr_{0.01}V_{0.01}Al_{0.01}Sb_{0.01}Zn_{0.01}O_2$ |
| $Na_{0.667}Mn_{0.666}Ni_{0.167}Co_{0.117}P_{0.01}Cr_{0.01}V_{0.01}Al_{0.01}Sb_{0.01}Zn_{0.01}O_2$ |

According to alternative embodiments, the present invention features a composition used in a cathode for a sodium ion battery. In some embodiments, the composition is represented by a formula $Na_aMn_bNi_cCo_dO_e$. In preferred embodiments, the composition with the formula $Na_aMn_bNi_cCo_dO_e$ comprises ratios of elements in a range of: a from about 0.6 to 0.7; b from about 0.6 to 0.7; c from about 0.1 to 0.2; d from about 0.1 to 0.15; and e from about 1.9 to 2.1. In some embodiments, the respective proportions of the elements in the compositions may vary by plus or minus 10%. In some embodiments, the composition is represented by a formula $Na_{0.667}Mn_{0.666}Ni_{0.167}Co_{0.167}O_2$.

In some embodiments, the cathode material for a sodium (Na) battery with a composition $Na_aMn_bNi_cCo_dO_e$ has a discharge capacity that reaches 220 mhA/g (mhA is the unit of charge/capacity and g is the unit of weight. mhA/g is the unit of specific capacity) at low C-rates. In other embodiments, the composition has a discharge capacity that reaches 180 mhA/g at high C-rates.

According to some other embodiments, the present invention features a method of doping layered cathode materials in sodium ion batteries by using a "high entropy" doping strategy to introduce more than four impurity elements to the host materials. In one embodiment, the present invention features a method for synthesizing a cathode material for a sodium ion battery. In some embodiments, the method comprises: preparing a hydroxide precursor powder; mixing the hydroxide precursor powder with a sodium salt to prepare the cathode material precursor; and calcining the cathode material precursor to form the cathode material.

In other embodiments, the hydroxide precursor powder is prepared by a method comprising: dissolving nickel salt, manganese salt, and cobalt salt in a solvent to make a hydroxide precursor solution; preparing a base solution comprising at least one base dissolved in a solvent; mixing the hydroxide precursor solution with the base solution to produce the hydroxide precursor powder; isolating the hydroxide precursor powder from the solution; and drying the hydroxide precursor powder. Non-limiting examples of metal salts that may be used to prepare the composition include: $MnSO_4$, $CoSO_4$, $NiSO_4$, and $NaCO_3$. However, the metal salts are not limited to the aforementioned examples, and may be any suitable metal salt.

The present invention features a composition used in a cathode for a sodium ion battery. In some embodiments, the composition is represented by a formula $Na_aMn_bNi_cCo_dTi_eMg_fMo_gNb_hCu_iO_j$. In preferred embodiments, the composition with the formula $Na_aMn_bNi_cCo_dTi_eMg_fMo_gNb_hCu_iO_j$ comprises ratios of elements in a range of: a from about 0.6 to 0.7; b from about 0.6 to 0.7; c from about 0.1 to 0.2; d from about 0.1 to 0.15; e from about 0.005 to 0.02; f from about 0.005 to 0.02; g from about 0.005 to 0.02; h from about 0.005 to 0.02; i from about 0.005 to 0.02, and j from about 1.9 to 2.1. In some embodiments, the respective proportions of the elements in the compositions may vary by plus or minus 10%. In some embodiments, the composition is represented by a formula $Na_{0.667}Mn_{0.666}Ni_{0.167}Co_{0.107}Ti_{0.01}Mg_{0.01}Mo_{0.01}Nb_{0.01}Cu_{0.01}O_2$.

In other embodiments, the composition with the formula $Na_aMn_bNi_cCo_dTi_eMg_fMo_gNb_hCu_iO_j$ reaches a discharge capacity of about 195 mhA/g at low C-rates. In some embodiments, the discharge capacity at high C-rates reaches about 180 mhA/g. In one embodiment, the composition with the formula $Na_aMn_bNi_cCo_dTi_eMg_fMo_gNb_hCu_iO_j$ has a capacity retention that reaches 120 mhA/g at a C-rate of 5 C.

In some embodiments, the composition with the formula $Na_aMn_bNi_cCo_dTi_eMg_fMo_gNb_hCu_iO_j$ has a slower capacity fading as compared to the baseline $Na_aMn_bNi_cCo_dO_e$ composition. In some embodiments, at 1 C, the composition has 77% capacity retention after 100 cycles compared to 54% capacity retention after 100 cycles for the $Na_aMn_bNi_cCo_dO_e$ composition. In other embodiments, at 0.1 C, the composition has 77% capacity retention after 70 cycles compared to 54% capacity retention after 70 cycles for the $Na_aMn_bNi_cCo_dO_e$ composition. In other embodiments, the composition with the formula $Na_aMn_bNi_cCo_dTi_eMg_fMo_gNb_hCu_iO_j$ has a slower impedance development as compared to the baseline $Na_aMn_bNi_cCo_dO_e$ composition.

The present invention features a method of doping layered cathode materials in sodium ion batteries by using a "high entropy" doping strategy to introduce more than four impurity elements to the host materials. In one embodiment, the present invention features a method for synthesizing a cathode material for a sodium ion battery. In some embodiments, the method comprises: preparing a hydroxide precursor powder; mixing the hydroxide precursor powder with a sodium salt to prepare the cathode material precursor; and calcining the cathode material precursor to form the cathode material.

In other embodiments, the hydroxide precursor powder is prepared by a method comprising: dissolving nickel salt, manganese salt, cobalt salt, titanium salt, magnesium salt, copper salt, molybdenum salt, and niobium salt in a solvent to make a hydroxide precursor solution; preparing a base solution comprising at least one base dissolved in a solvent; mixing the hydroxide precursor solution with the base solution to produce the hydroxide precursor powder; isolating the hydroxide precursor powder from the solution; and drying the hydroxide precursor powder. Non-limiting examples of metal salts that may be used to prepare the composition include: $MnSO_4$, $CoSO_4$, $NiSO_4$, $TiOSO_4$, $MgSO_4$, $CuSO_4$, $(NH_4)_6Mo_7O_{24}$ (ammonium molybdate), $C_{10}H_5NbO_{20}$ (Niobium oxalate), and $NaCO_3$. However, the metal salts are not limited to the aforementioned examples, and may be any suitable metal salt.

EXAMPLE

The following is a non-limiting example of the present invention. It is to be understood that said example is not intended to limit the present invention in any way. Equivalents or substitutes are within the scope of the present invention.

Material Synthesis

Homogeneous $[Mn_{0.667}Ni_{0.167}Co_{0.117}Ti_{0.01}Mg_{0.01}Cu_{0.01}Mo_{0.01}Nb_{0.01}](OH)_2$ precursor was prepared using a modified coprecipitation method. Typically, an aqueous solution containing the stoichiometric amounts $MnSO_4$, $CoSO_4$, $NiSO_4$, $TiOSO_4$, $MgSO_4$, $CuSO_4$, $(NH_4)_6Mo_7O_{24}$ (ammonium molybdate) and $C_{10}H_5NbO_{20}$ (Niobium oxalate) was pumped into continuously stirred round-bottom flask (250 mL) with argon atmosphere protection. Simultaneously, appropriate amount of precipitation agent (NaOH) and chelating agent ($NH_3 \cdot H_2O$) were separately fed into the reactor. The temperature, pH and stirring speed of the solution were carefully maintained at 60° C., ~ 10.5 and 350 rpm, respectively. The corresponding precipitate was then filtered, washed and dried at 110° C. For comparison, the $[Mn_{0.667}Ni_{0.167}Co_{0.167}](OH)_2$ precursor was prepared via a similar synthesis method, except adjusting the amount of transition metal solution.

After that, the as-prepared precursors were thoroughly mixed with NaCO$_3$ with a molar ratio of Na:Mn=1.05:1, and the excess sodium source was used for the compensation of sodium loss during the sintering process. Then, the mixtures were calcined in oxygen at 500° C. for 4 h and subsequently at 850° C. for 6 h to form a black powder. The final Na$_{0.667}$Mn$_{0.667}$Ni$_{0.167}$Co$_{0.117}$Ti$_{0.01}$Mg$_{0.01}$Cu$_{0.01}$Mo$_{0.01}$Nb$_{0.01}$O$_2$ and Na$_{0.667}$Mn$_{0.667}$Ni$_{0.167}$Co$_{0.167}$O$_2$ products were abbreviated to HE-NMNC and NMNC, respectively. The chemical composition ratio of Mn:Ni:Co:Ti:Mg:Mo:Cu:Nb in HE-NMNC was measured according to ICP-MS (Fisher Scientific) and is estimated to be 5.7:1.4:1:0.08:0.08:0.08:0.08:0.08.

Electrochemical Measurement

The electrochemical tests were carried out using standard CR2032 coin cells, which were assembled in an argon filled glove box (H$_2$O<0.1 ppm, O2<0.1 ppm). The cathode electrodes were composed of 80% active materials, 10% super P and 10% poly(vinylidene difluoride) (PVDF) binder. The area loading of active materials on Al foil was kept at ~3 mg cm-2. The Whatman glass microfiber filter (GF/D 1823) was used as separator, and 1 M sodium perchlorate (NaClO$_4$) dissolved in the mixture of polycarbonate (PC)/fluoroethylene carbonate (FEC) (7:3 in volume) was operated as electrolyte. The galvanostatic charge-discharge tests were conducted using a Neware battery cycler at room temperature. Cyclic voltammetry (CV) measurements were operated on a BioLogic electrochemical workstation under a scan rate of 0.1 mV s-1. Electrochemical impedance spectroscopy (EIS) was evaluated on a PARSTAT 2273 workstation with an amplitude (sinusoidal voltage) of 5 mV and a frequency range from 105 to 10-2 Hz. The galvanostatic intermittent titration (GITT) measurement was measured by applying a series of (dis-) charge pulses (0.1 C) and relaxation periods (120 min) at a voltage of 1.5-4.5 V.

Material Characterization

The phase structure and lattice parameters are conducted by Rietveld refinements of XRD patterns.

Figure 2A:
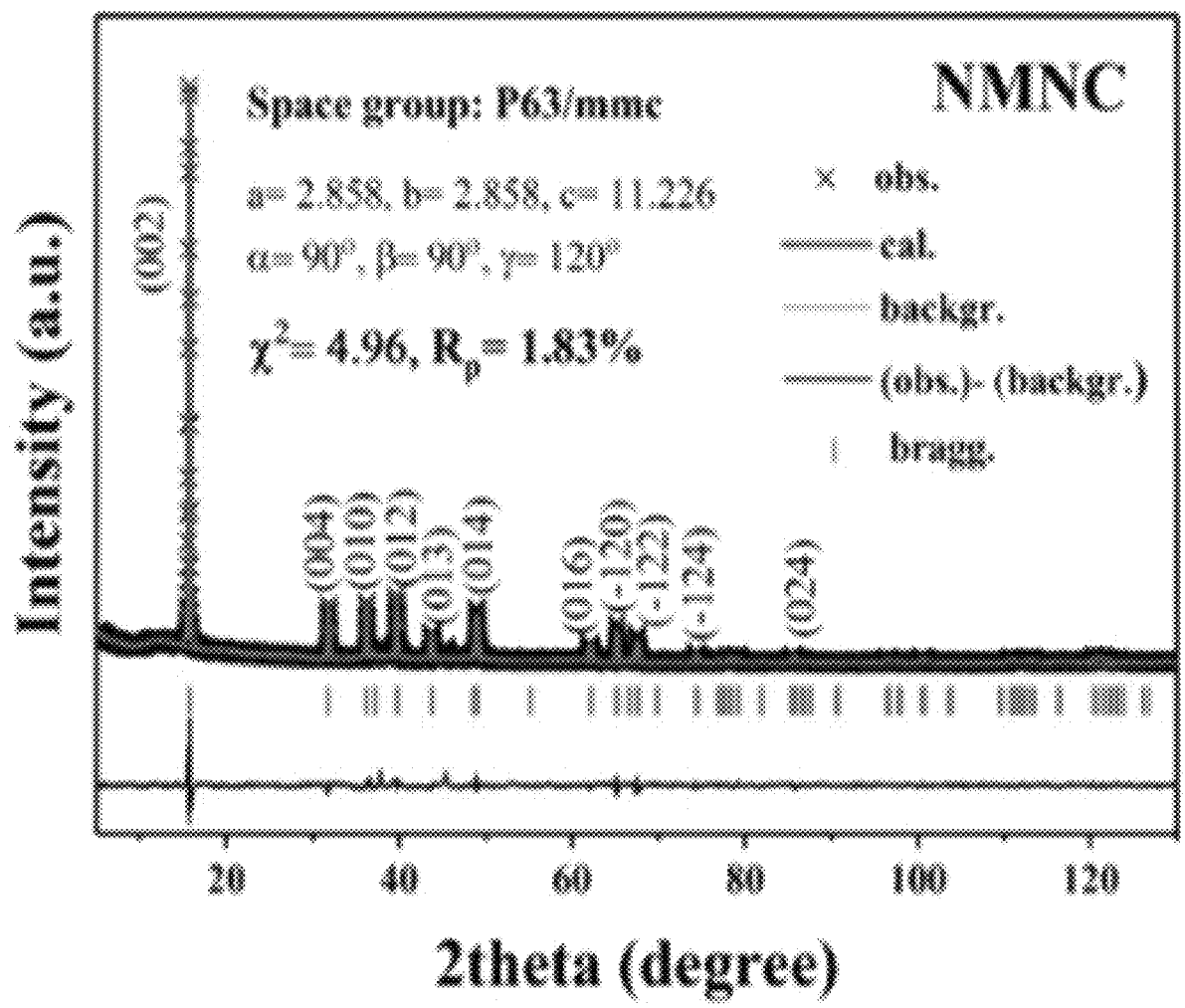
Figure 2B:
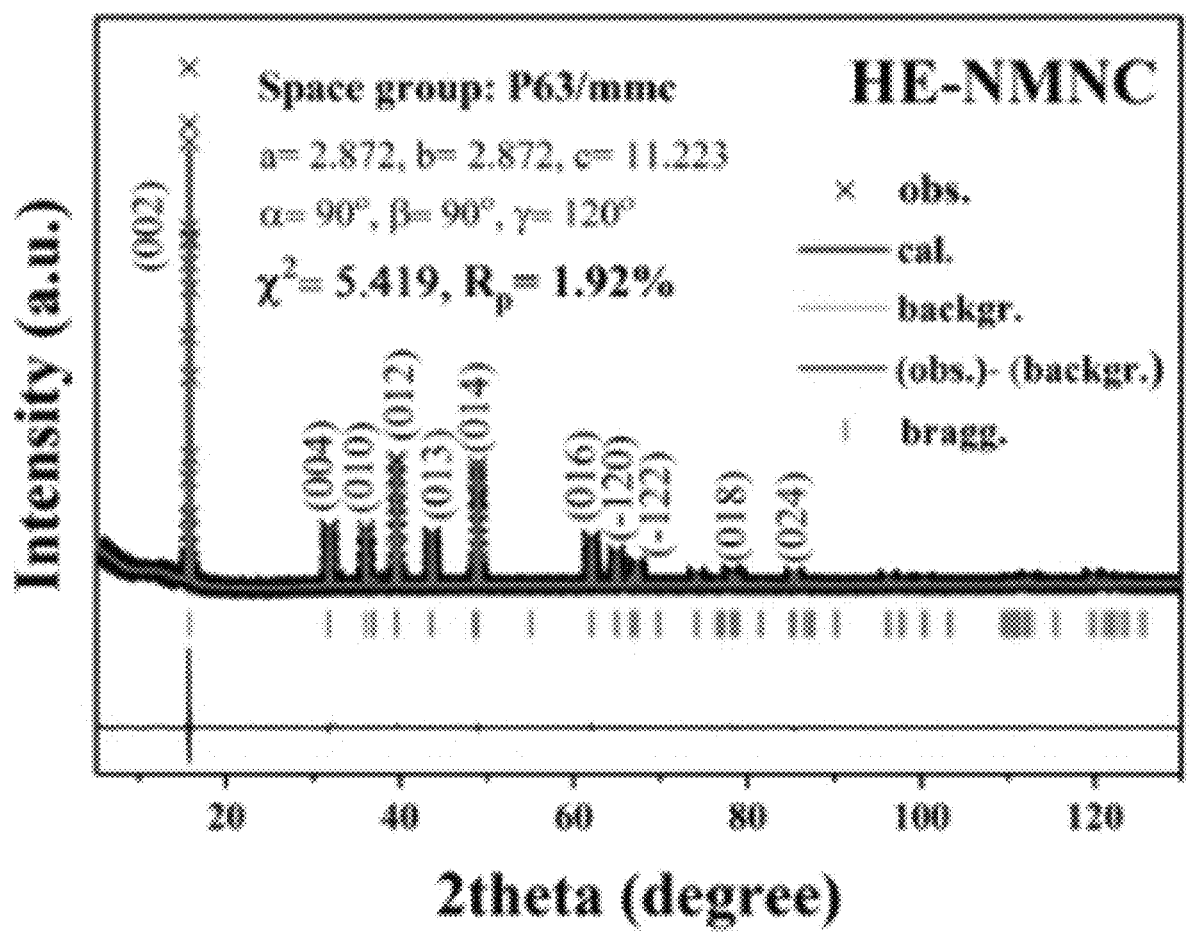
Figure 2C:
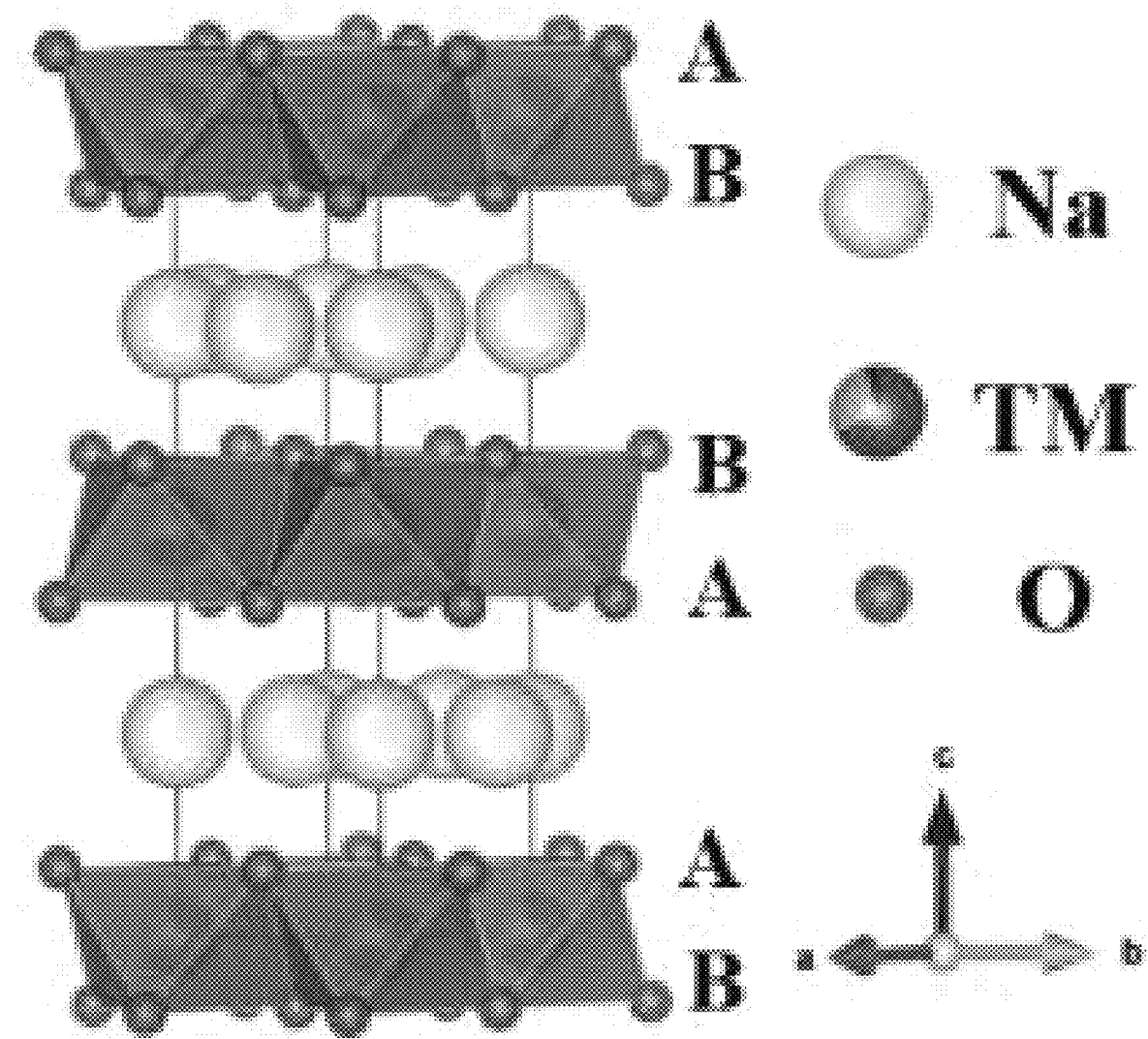

FIG. 2A shows all the diffraction peaks of NMNC can be well indexed to a typical P2-phase structure in the hexagonal space group P63/mmc. For the HE-NMNC sample, the P2-type structure is well maintained without any impurity phase, confirming the successful doping of heteroatoms (FIG. 2B). Compared with NMNC, the HE-NMNC reveals an increased lattice parameters of a and b, due to the doped TM heteroatoms with various radii that can expand the crystal lattice. The microstructure of cathode materials was further conducted by FESEM and TEM.

Figure 7B:
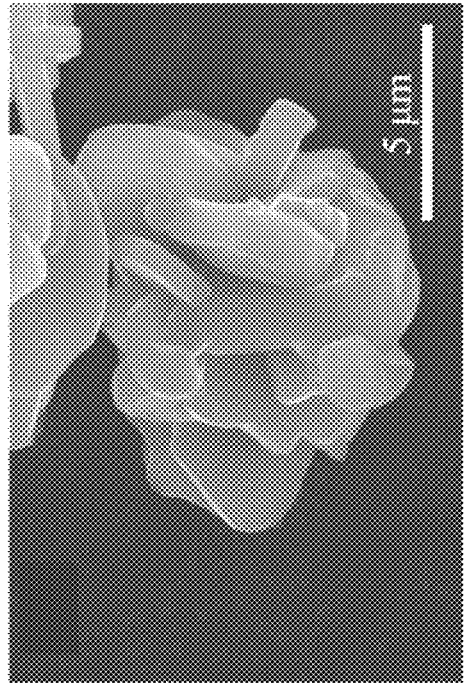
FIGS. 7A-7B show the SEM images of HE-NMNC with different magnifications, (FIG. 7A) at 20 μm magnification, (FIG. 7B) at 5 μm magnification.
Figure 7A:
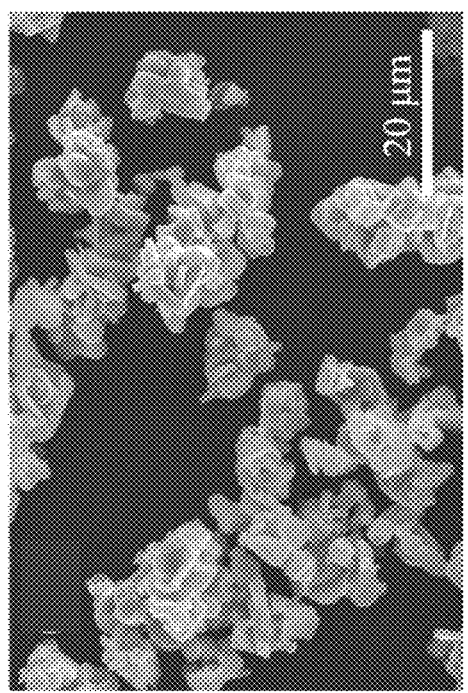
Figure 8B:
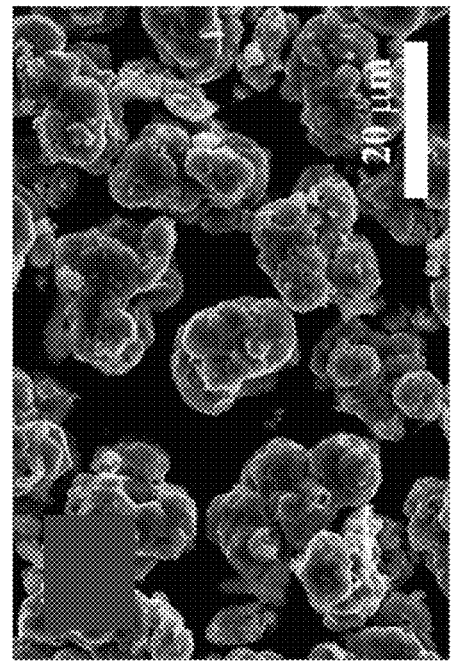
FIGS. 8A-8B shows the SEM images of NMNC with different magnifications, (FIG. 8A) at 50 μm magnification, (FIG. 8B) at 20 μm magnification.
Figure 8A:
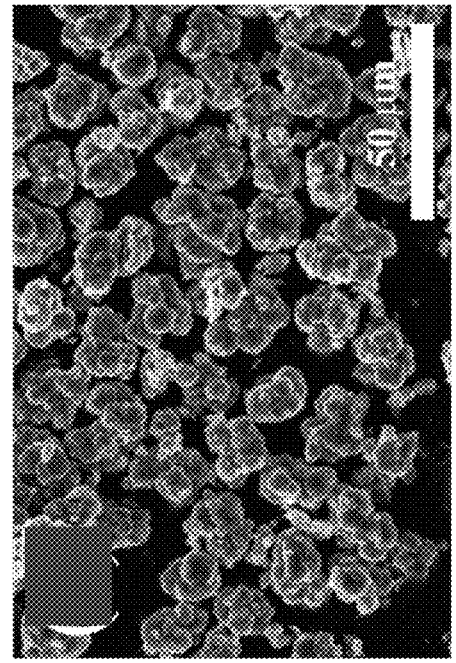
Figure 11A:
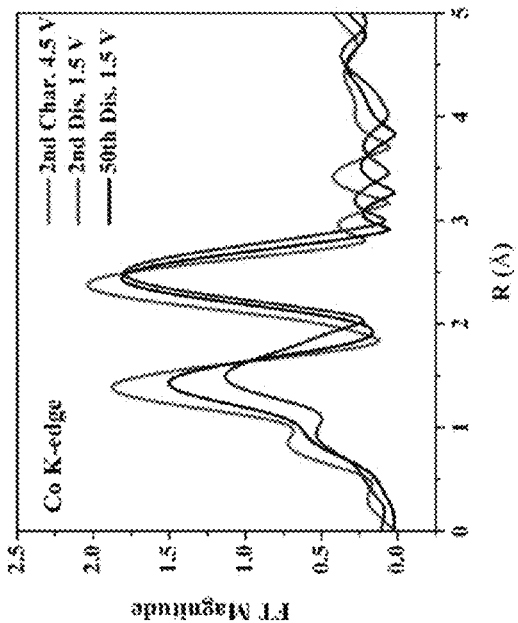
FIGS. 11A-11B show the Ex-situ XAS spectra of HE-NMNC at the 2nd and 50th cycles (FIG. 11A) Co XANES, (FIG. 11B) Co EXAFS.
Figure 11B:
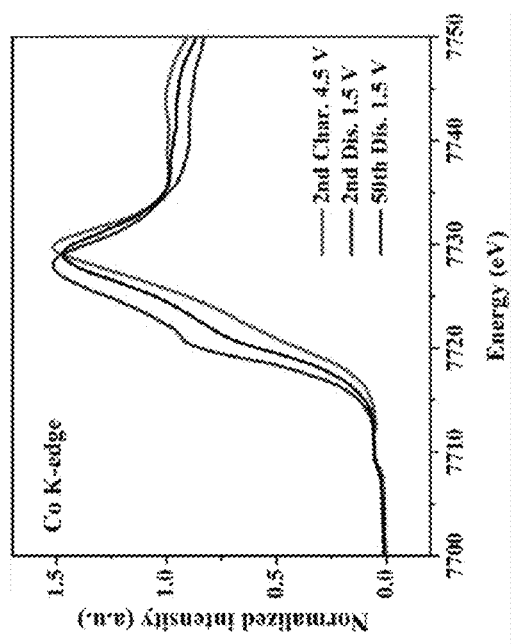

FIG. 2D and FIG. 7A-7B show the HE-NMNC mainly consists of micrometer-sized particles with a diameter of around 10 μm, which are composed of multiple-layer oriented stacking nanoflakes. The NMNC processes a similar micrometer-sized particle morphology (FIG. 8A-8B).

In order to grasp more insights into structural and electronic information of the HE-NMNC, advanced scanning transmission electron microscopy (STEM) combined with high-angle annular dark field (HAADF) are employed. The bright-dot contrasts in HADDF-STEM represent the transition metal atom columns in TMO$_2$ slabs.

FIG. 2E shows the distance of adjacent TMO$_2$ slabs is measured to be ~0.558 nm, which is well consistent with the inter-slab distance from XRD refinement. The high-resolution TEM images of the HE-NMNC reveal the clear lattice fringes with interplanar distance of 0.56 nm, which matches well the d-spacing value of (002) plane of the hexagonal structure (FIG. 2F).

Selected area electron diffraction (SAED) was further conducted to confirm the specific structure of HE-NMNC (FIG. 2G). The round Bragg diffraction spots can be indexed to the representative reflections of the P2 layered structure viewed along axis.

FIG. 2H displays the STEM energy-dispersive spectroscopy mapping of HE-NMNC, which indicates the uniform distribution of various TM species (Mn, Ni, Co, Ti, Mg, Mo, Cu and Nb) within the particles.

Ex-situ X-ray adsorption spectroscopy (XAS) are employed to elucidate the charge compensation mechanism and local bonding environment variations of the prepared materials upon Na+ extraction/insertion.

Figure 3A:
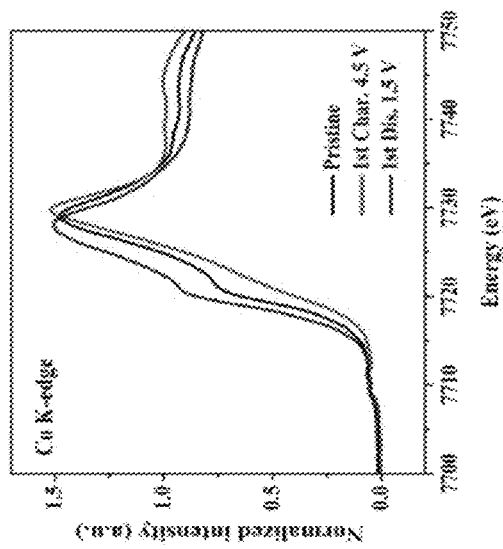
FIGS. 3A-3F show the Ex-situ XAS spectra of HE-NMNC at different (dis-) charge states of first cycle, (FIG. 3A) Mn K-edge XANES, (FIG. 3B) Ni K-edge XANES, (FIG. 3C) Co K-edge XANES, (FIG. 3D) Mn K-edge EXAFS, (FIG. 3E) Ni K-edge EXAFS, (FIG. 3F) Co K-edge EXAFS.
Figure 3B:
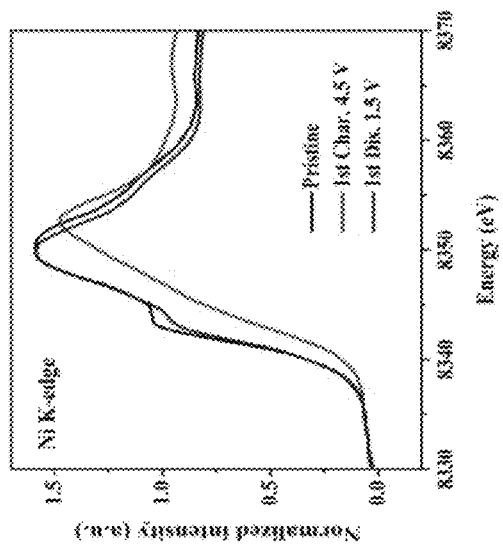

FIG. 3A displays the X-ray absorption near-edge absorption structure (XANES) at Mn K-edge. During the first charging process, the position of Mn-edge adsorption peak of HE-NMNC displays no apparent changes, implying the tetravalent Mn ions are electrochemically inactive at high voltage region (open circuit potential (OCP) ~2.6 V to 4.5 V). While the obvious negative shift of Mn K-edge spectrum during the first discharge process is associated with the Mn$^{3+}$/Mn$^{4+}$ redox at a potential lower than 2.5 V, which is highly consistent with CV results. The variation tendency of Mn K-edge spectrum in the second cycle is similar to that in the first cycle, illustrating a reversible electrochemical reaction during cycling (FIG. 9). Additionally, almost no shifts of Mn-edge are observed in the 50th cycled electrode, indicating the high stability of Mn during the (dis-) charge process. The Ni K-edge shows apparent shifts toward the high energy region (~ 2.5 eV) as charge increases from OCP to 4.5 V, and recovers well back to that of pristine electrode after fully discharge to 1.5 V (FIG. 3B). It indicates that the Ni$^{2+}$/Ni$^{4+}$ redox couple are mainly contributed to the charge compensation mechanism during high voltage windows (OCP to 4.5 V).

Figure 3C:
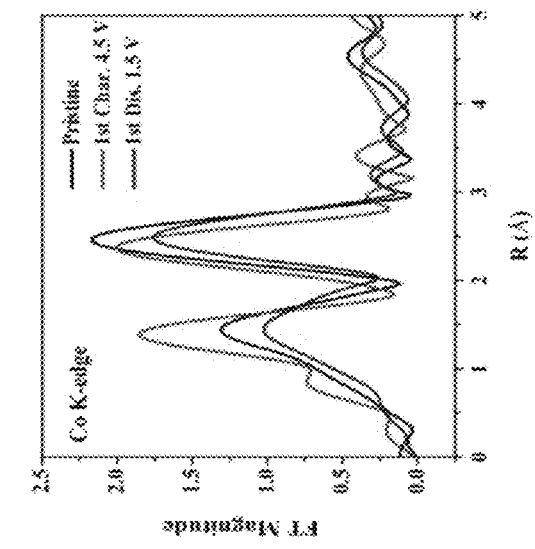

Similar to the Mn-edge spectrum, the Ni K-edge spectrum also displays high reversibility during the second and long-term cycles (FIG. 10). As shown in FIG. 3C, the position of Co K-edge absorption peak in pristine HE-NMNC is slightly higher than that of fully discharged electrode (1.5 V, divalent), implying the pristine sample contains a small amount of trivalent cobalt. Additionally, the reversible shifts of Co K-edge spectrum in the first two cycles are mainly associated with the electrochemically active Co$^{2+}$/Co$^{3+}$ redox at the potentials higher than 3.0 V. Thus, the HE-NMNC consists of lower content of electrochemically active cobalt than NMNC, which leads to a slightly decreased (dis-) charge capacity.

The interatomic distance information of HE-NMNC at different (dis-) charge states is further demonstrated by extended X-ray absorption fine structure (EXAFS) spectra at Mn, Ni and Co K-edge. The EXAFS spectra display two kinds of intense peaks at around 1.7 Å and 2.6 Å, which can be assigned to metal-oxygen (Me-O) first coordination and metal-metal (Me-Me) second coordination.

Figure 3D:
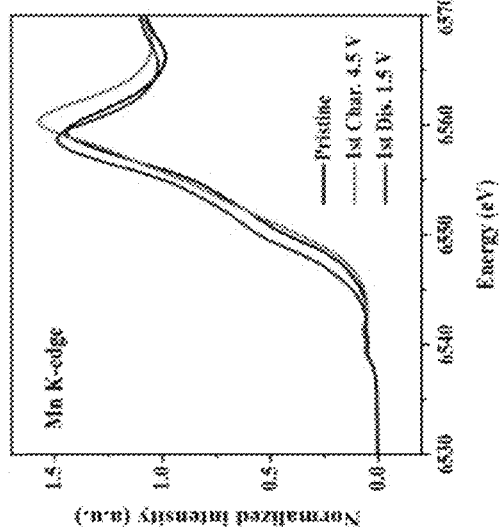

FIG. 3D shows the interatomic distance of Mn—O shows almost no changes by oxidation to 4.5 V and clearly increases after reduction to 1.5 V. It is related to the lower electrochemically active potential window of Mn3+/Mn4+ redox, which is well consistent with the XANES results.

Figure 3E:
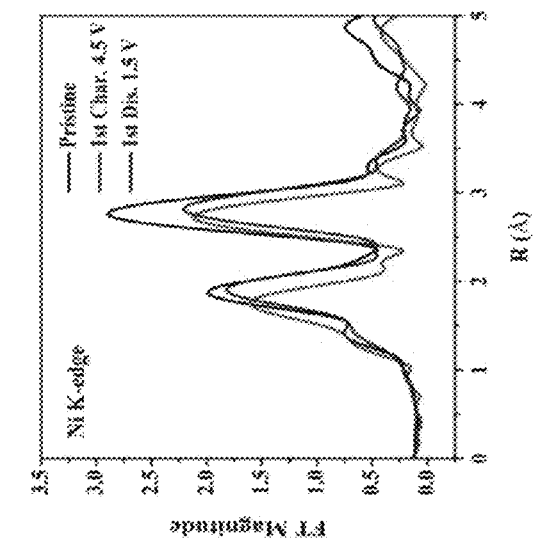
Figure 3F:
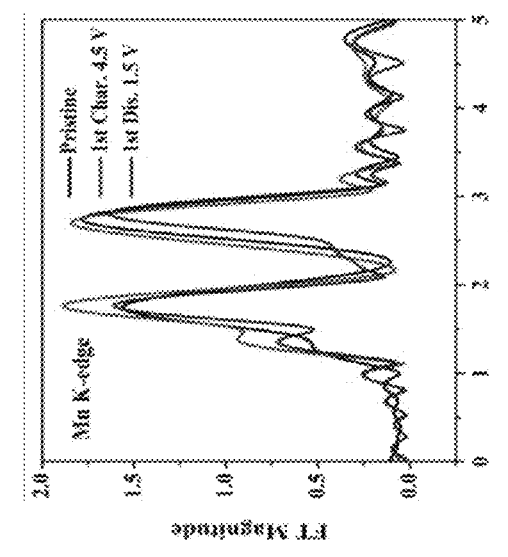

The Me-O interatomic distances at Ni and Co K-edge are clearly shortened after charging to 4.5 V, corresponding to the electrochemically active nickel and cobalt ions compensating for charge balance in the potentials upon 3.0 V (FIG. 3E-3F). After full insertion of Na+ into the crystal lattice, the Me-O interatomic distances of Ni and Co K-edge are increased reversibly. In the second TM-TM coordination shells, the interatomic distances of Mn-TM (2.758 Å, Pristine), Ni-TM (2.760 Å, Pristine) and Co-TM (2.760 Å, Pristine) are comparable, implying Mn, Ni and Co ions are uniformly distributed in the transition metal layers. Additionally, the in-plane interatomic distances of those three elements' K-edge (Ni, Co, Mn) will decrease after charging to 4.5 V, which is in good agreement with the decreased apex lattice parameters upon Na+ extractions by XRD observation. The XAS spectra variation of all those three TM elements (Ni, Co, Mn) in the second cycle is similar with that in the first cycle, indicating the high redox reversibility during electrochemical cycling (FIGS. 9A-11B).

Figure 12A:
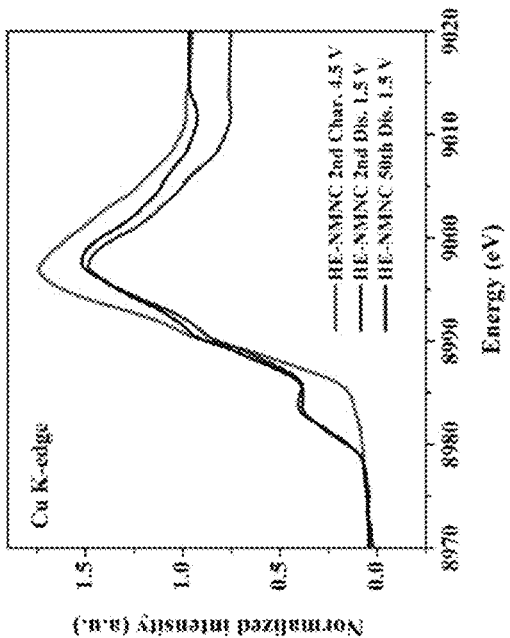
FIGS. 12A-12B show the Ex-situ Cu K-edge XANES spectra of HE-NMNC at different cycles.
Figure 12B:
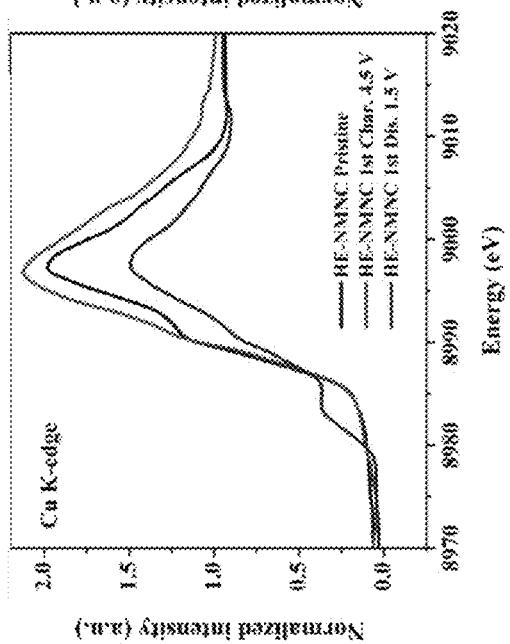
Figure 14A:
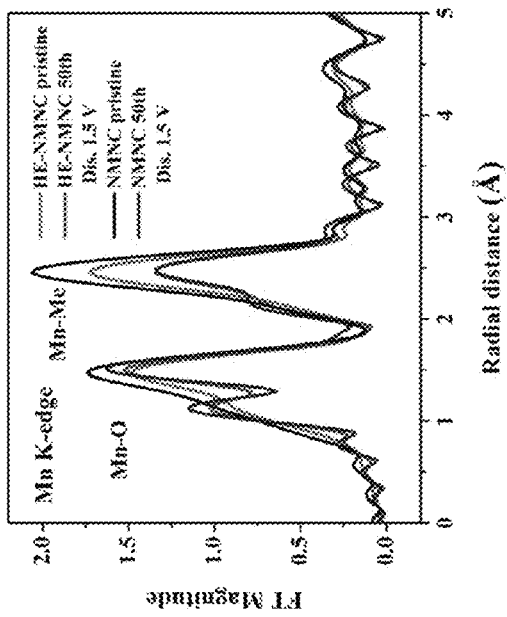
FIGS. 14A-14B show the Ex-situ XAS spectra of HE-NMNC and NMNC at different cycles (FIG. 14A) Mn XANES, (FIG. 14B) Mn EXAFS.
Figure 14B:
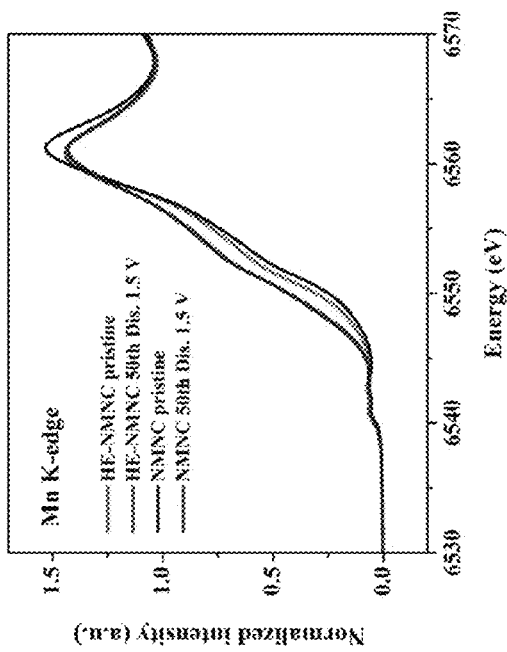
Figure 15A:
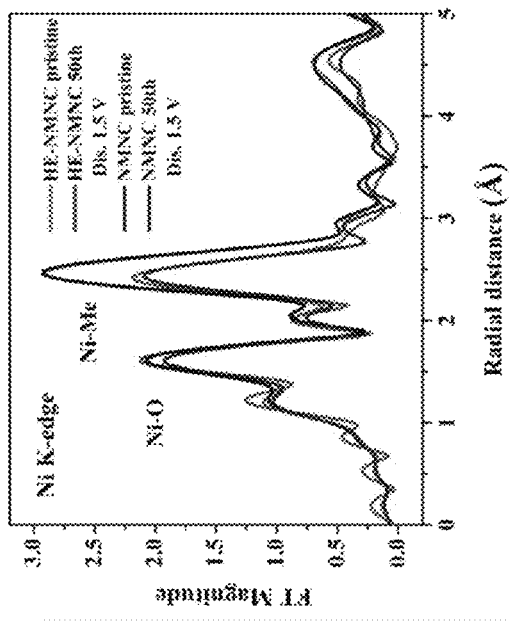
FIGS. 15A-15B show the Ex-situ XAS spectra of HE-NMNC and NMNC at different cycles (FIG. 15A) Ni XANES, (FIG. 15B) Ni EXAFS.
Figure 15B:
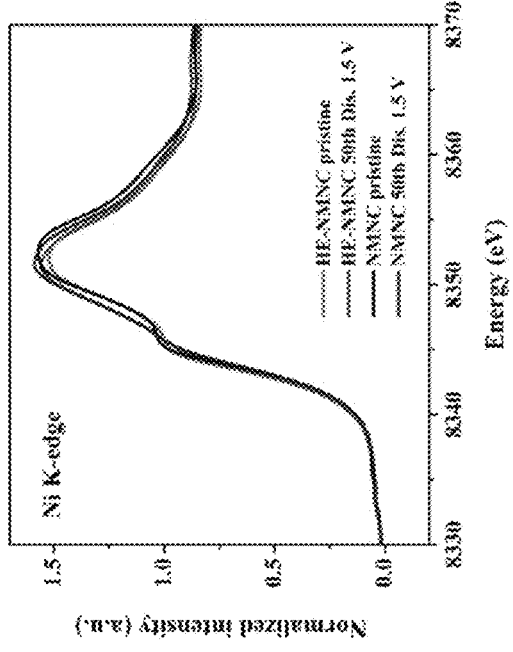
Figure 16A:
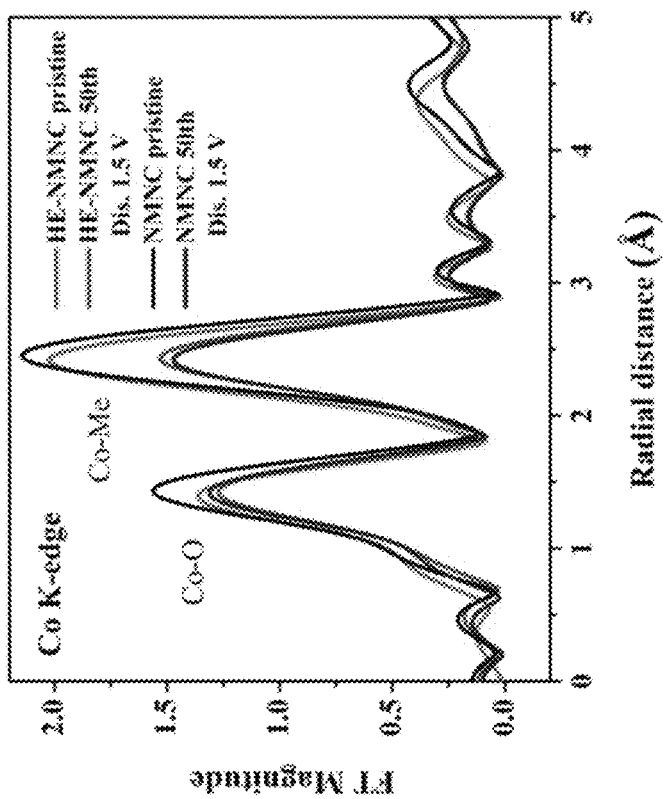
FIGS. 16A-16B show the Ex-situ XAS spectra of HE-NMNC and NMNC at different cycles (FIG. 16A) Co XANES, (FIG. 16B) Co EXAFS.
Figure 16B:
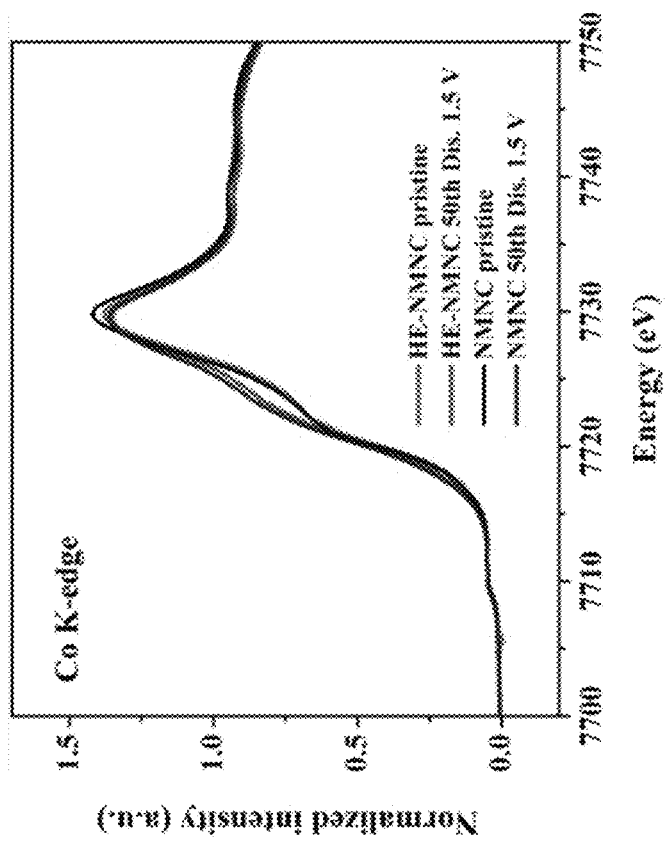

After 50 cycles, the peaks intensity for both Me-O and Me-Me (Ni, Co and Mn) are slightly reduced, indicating the distortion around TM. The Cu XANES spectra (FIGS. 12A-12B) of HE-NMNC display no variations at first charge process and obvious negative shifts after discharge to 1.5 V, indicating the redox activity of Cu2+/Cu3+ couples occur at a voltage of 1.5-2.6 V (OCP). Additionally, the Cu2+/Cu3+ redox keeps high reversibility during cycling.

The XANES spectra (FIG. 13A-13C) of doped Mo, Nb and Ti after 50 cycles deliver negligible variation, implying the high stability of doped elements in HE-NMNC. The refined structure variations of NMNC after 50 cycles are also investigated by XAS, as shown in FIG. 14A-16B. Compared with NMNC, HE-NMNC exhibits smaller local bonding environment variations after long-term cycling, which suggests high-entropy substitution is a useful strategy to enhance the structure stability of cathodes.

Ex-situ synchrotron XRD was conducted to probe phase evolution of the HE-NMNC during electrochemical cycling. The XRD pattern of the 1st fully charged sample (4.5 V) also maintains P63/mmc space group, with a P2 crystal structure upon Na extraction (FIG. 4A). However, the (002) peak drastically shifts to lower angle upon charge, implying an increased c lattice parameter. Previous reports speculated that the solvent molecules and salt ions can insert TM layers with Na+ extraction, causing increased interlayer distance. The c lattice parameter at 4.5 V charge increases to almost 7 Å, indicating the crystal structure after Na+ removal is vulnerable to the insertion of solvent molecules. Moreover, the XRD patterns of fully discharged samples (1st and 30th Dis. 1.5 V) keeps a well P2 phase structure similar to that of pristine material, suggesting good phase structural reversibility during Na+ insertion/extraction.

Figure 17:
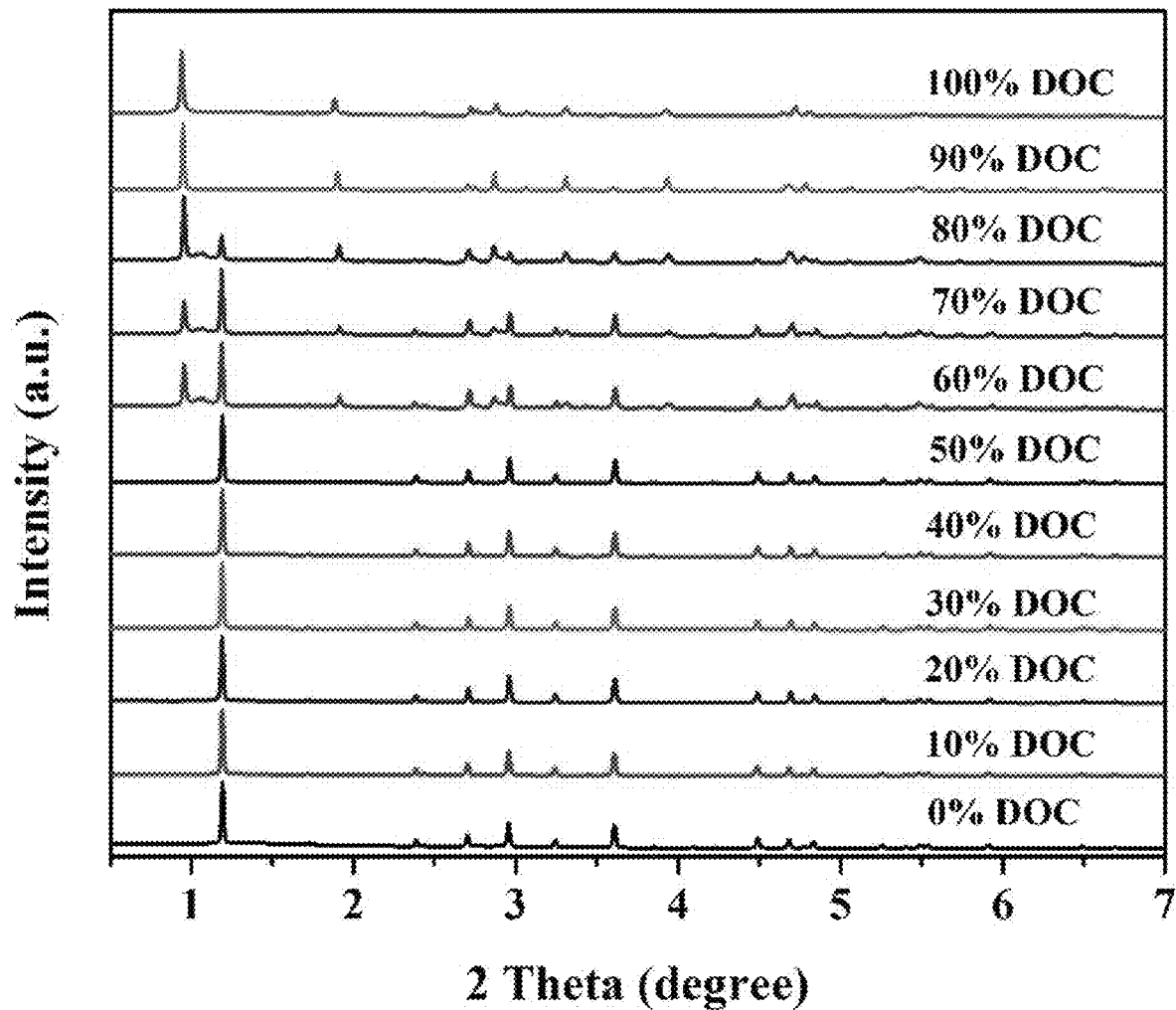
FIG. 17 shows the Ex-situ XRD of HE-NMNC at the third charging process.

The ex-situ XRD in 3th cycle with various depth of charge (DOD) was conducted to detailly investigate the phase structural evolution upon charging (FIG. 4B, FIG. 17A-17B). Interestingly, the (002) peak of XRD patterns gradually shifts to lower angle with the increasing of DOD. When cycled at a 60% DOD (~3.55 V), (002) diffraction peaks at ~0.955o, corresponding to interlayer distance of ~7 Å, begin to appear, implying the beginning of solvent molecules insertion at ~3.55 V. The (002) peaks almost fully move from 1.1930 to 0.9550 at a DOD of 90%, with a charging voltage of 4.35 V. The above results illustrate that P2 phase $Na_xTMO_2$ layer materials will suffer solvent molecule insertions at an early charging state.

The structure variations of HE-NMNC at fully (dis-) charge states are further identified by atomic-scale HAADF STEM. Upon charging to 4.5 V, the HAADF STEM image (FIG. 4C) reveals well head-to-head TMO2 layer stacking, which is structurally mirror-symmetric in the P2-phase. In addition, the adjacent layer distance in c-axis can reach to 0.71 nm, due to the insertion of solvent molecules in layers with Na+ removal. However, the HAADF STEM image (FIG. 4D) of HE-NMNC at 1.5 V still displays well the P2 phase structure with interlayer distance of 0.57 nm, which is similar to that of pristine material. The above TEM results indicate the reversible P2 phase variation during cycling, which highly agrees well with ex-situ XRD results.

Figure 5A:
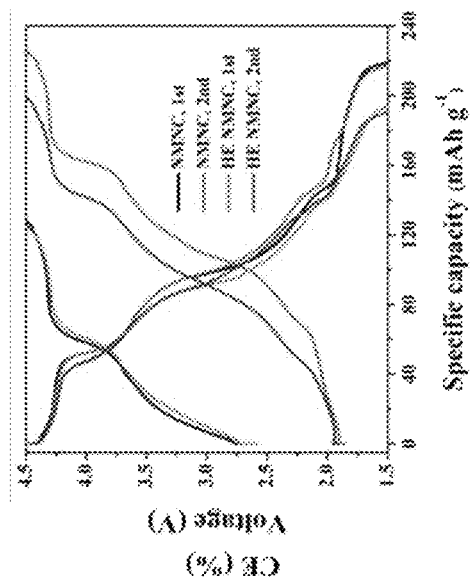
FIGS. 5A-5F show the (FIG. 5A) CV curves of NMNC and HE-NMNC, (FIG. 5B) the first two (dis-) charge curves of cathodes, (FIG. 5C) rate capabilities of cathodes, (FIG. 5D) cycling performance of cathodes at 1 C, (FIG. 5E) OCV curves of cathodes for resting 72 h after discharged to 4.15 V, (FIG. 5F) GITT curves of cathodes.

The electrochemical properties of cathodes are examined in Na half-cell in the voltage of 1.5-4.5 V at room temperature (1 C=175 mAh g-1). FIG. 5A displays the CV curves of NMNC and HE-NMNC in the first three cycles. A series of complicated CV peaks are observed, implying a multitude of electrochemical reactions and possible phase transitions. The CV peaks between 3.0 and 4.0 V are assigned to the redox of $Ni^{2+}/Ni^{4+}$ and $Co^{2+}/Co^{3+}$, and the peaks above 4.2 V are attributed to the reversible lattice redox as previous reports. The NMNC reveals significant redox peaks below 2.0 V, which is associated with the $Mn^{3+}/Mn^{4+}$ redox couple.

Generally, six-coordinate $Mn^{3+}$ (t2g3-eg1) results in large structure variation owing to co-operative Jahn-Teller distortion, leading to serious capacity decay. After chemical elements substitution, the CV curves of HE-NMNC electrodes become smoother, especially in voltage of below 2.0 V and above 4.2 V, indicating the HE doping can suppress the Jahn-Teller distortion and P2-O2 phase transformation. Additionally, CV profiles of HE-NMNC in the first three cycles are well overlapped, illustrating the high reversibility of the cathode.

Figure 5B:
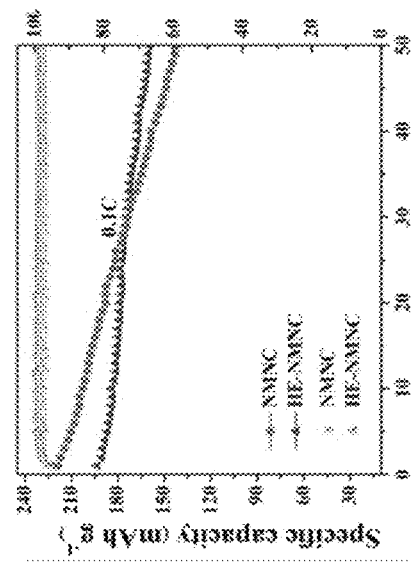
Figure 5C:
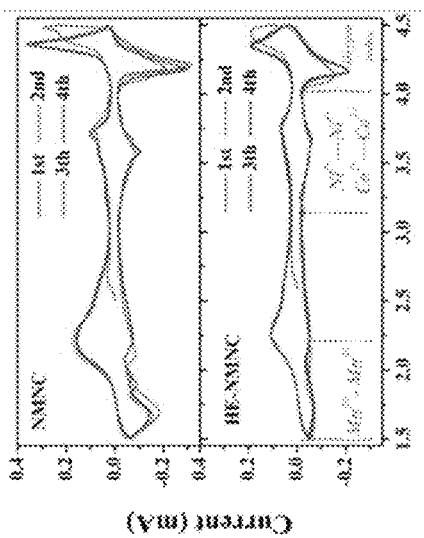

FIG. 5B displays the galvanostatic (dis-) charge cycling performance of cathodes at 0.1 C. At 0.1 C, the initial discharge capacity of NMNC is 180 mAh g-1, while that of HE-NMNC decreased to 180 mAh g-1 due to inert TM cation doping. After 50 cycles at 0.1 C, the HE-NMNC delivers 80% of capacity retention, much higher than that of NMNC (50%). Additionally, the Coulombic efficiencies (CE) of HE-NMNC are always greater than 99.5% and more stable than those of NMNC. The corresponding (dis-) charge curves of cathodes in the first two cycles are shown in FIG. 5C. NMNC displays multiple voltage plateaus during cycling, while the HE-NMNC exhibits more smoother (dis-) charge curves. It indicates that the HE doping can effectively suppress multiple phase transitions occurring along with TMO2 slab gliding, which is well consistent with the CV results. The C-rate capability is conducted at a series of current densities from 0.1 C to 5 C, then recovered back to 0.2 C.

Figure 5D:
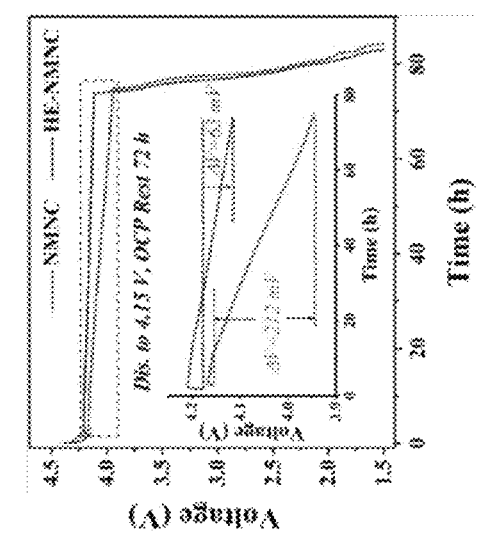
Figure 5E:
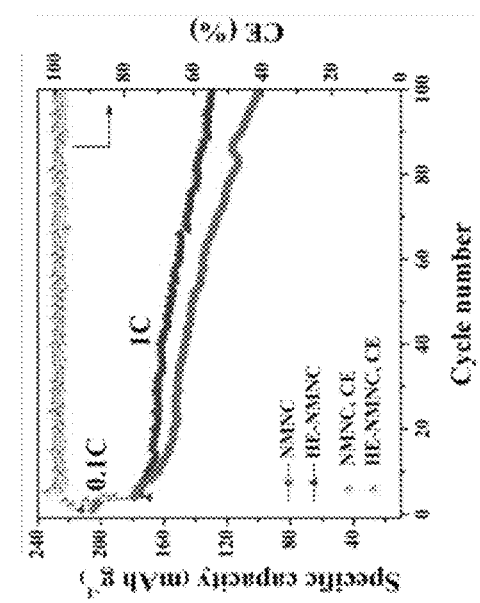

As shown in FIG. 5D, the NMNC achieves reversible capacity of 218, 199, 178, 150, 118 and 68 mAh g-1, at current densities of 0.1, 0.2, 0.5, 1, 2 and 5 C, respectively. Notably, HE-NMNC exhibits better C-rate performance, achieving a high specific capacity of 192, 177, 165, 155, 139 and 111 mAh g-1 at current densities from 0.1 C to 5 C. After the current density is set back to 0.2 C, the HE-NMNC displays a high reversible capacity of 165 mAh g-1, implying excellent cyclability. The related (dis-) charge curves at different rates are shown in FIG. 18. No severe voltage polarization is observed in HE-NMNC material with increased current densities. The long-term cycling performance is further evaluated at a high current density of 1 C for 100 cycles (FIG. 5E).

Figure 5F:
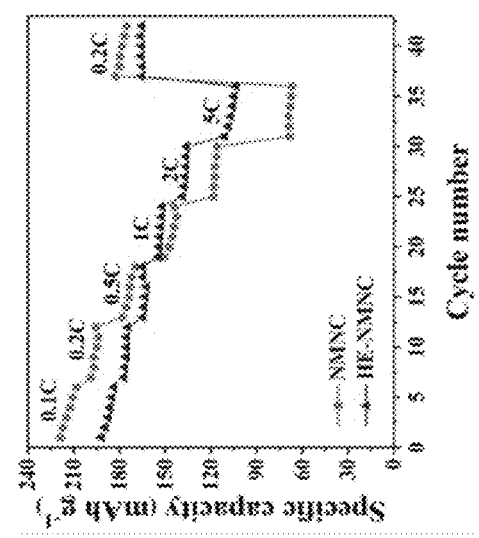

An initial discharge capacity of 179.3 mAh g-1 is achieved for NMNC at 1 C, and only 55.2% (98.9 mAh g-1) of initial capacity is maintained after 100 cycles. In contrast, HE-NMNC delivers an improved reversible discharge capacity of 169.8 mAh g-1 (1st) and 129.7 mAh g-1 (100th) at 1 C, corresponding to a good capacity retention of 76.4% after 100 cycles. To investigate self-discharge properties of the cathodes, coin-cells are rested for 72 h after discharged to 4.15 V, meanwhile the open circuit potential (OCP) is real-time recorded (FIG. 5F). The HE-NMNC exhibits a slighter voltage decay of 63 mV during 72 h, compared to that (212 mV) of NMNC, implying the high stability of HE-NMNC cathode.

Figure 19A:
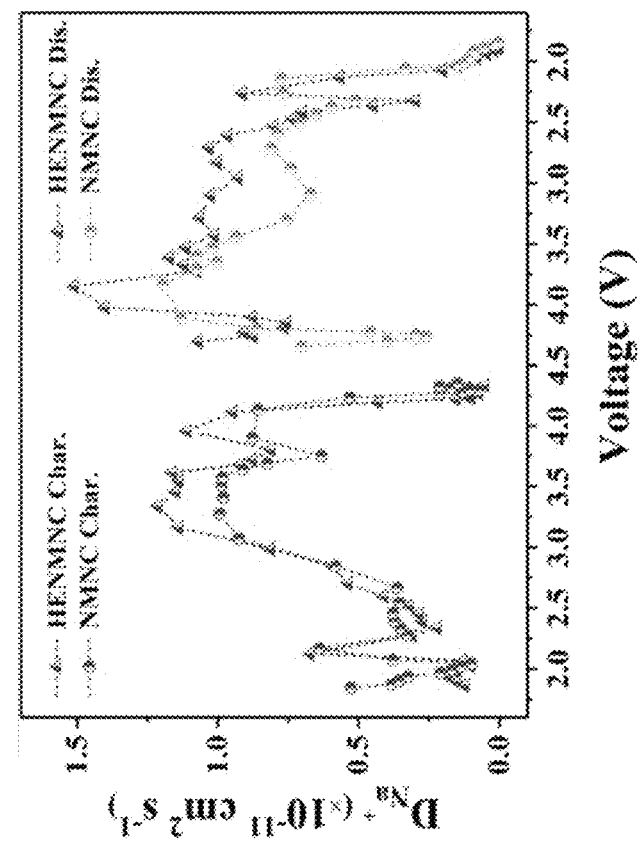
FIGS. 19A-19B show the GITT profiles of NMNC and HE-NMNC, (FIG. 19A) (dis-) charging (solid lines) and equilibrium voltage (dash lines) curves, (FIG. 19B) Na-ion diffusion coefficients.
Figure 19B:
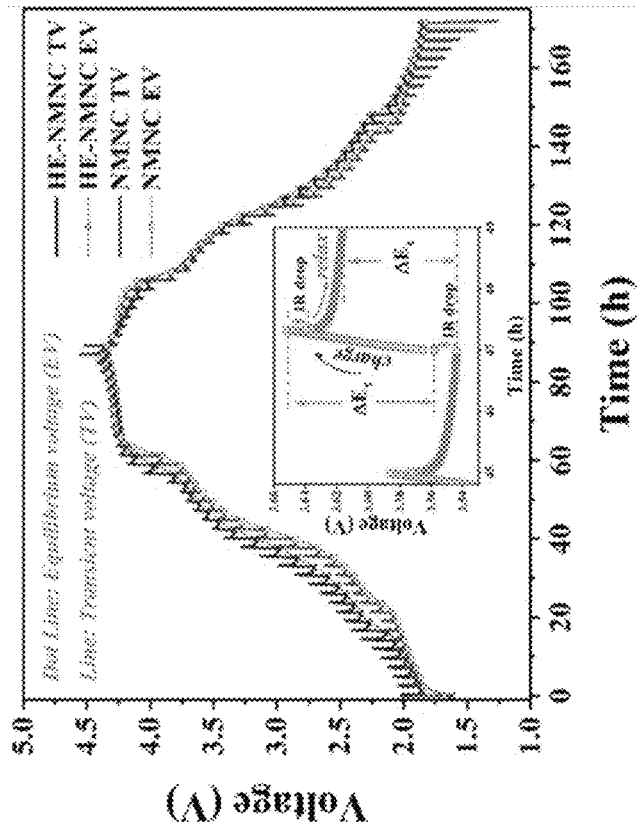

Galvanostatic intermittent titration technique (GITT) and electrochemical impedance spectroscopy (EIS) are further applied to elucidate the reaction kinetics of cells. As shown in FIG. 19A-19B, the Na+ diffusion coefficients at a voltage range of 3.0-4.5 V are higher than those below 3.0 V, due to the Ni/Co ions redox contributing to a faster reaction kinetic at high voltage. Compared with NMNC, the HE-NMNC delivers higher Na+ diffusion coefficients, implying the HE modification may promote electrochemical reaction kinetics.

Figure 20A:
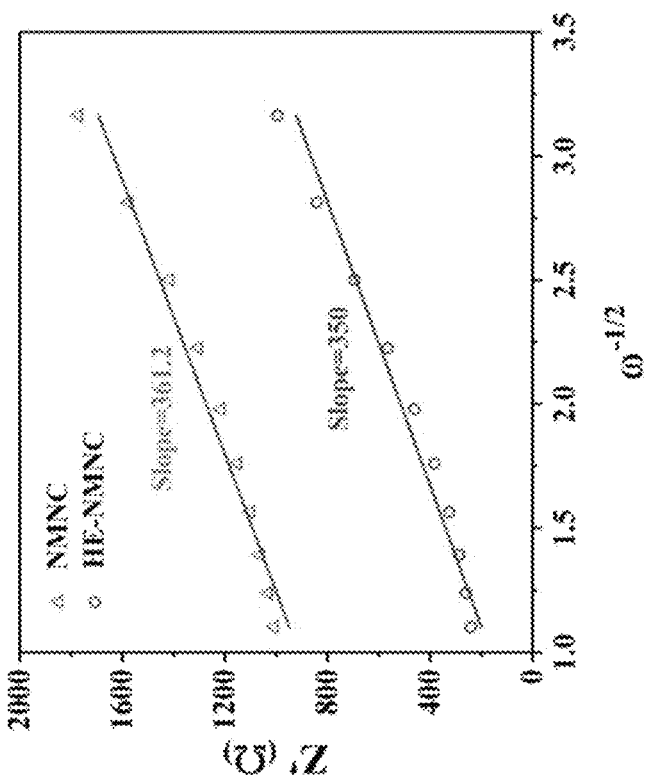
FIGS. 20A-20B show the EIS results of NMNC and HE-NMNC at different cycles, (FIG. 20A) Nyquist plots, (FIG. 20B) plots of Z' to $\omega^{-1/2}$.
Figure 20B:
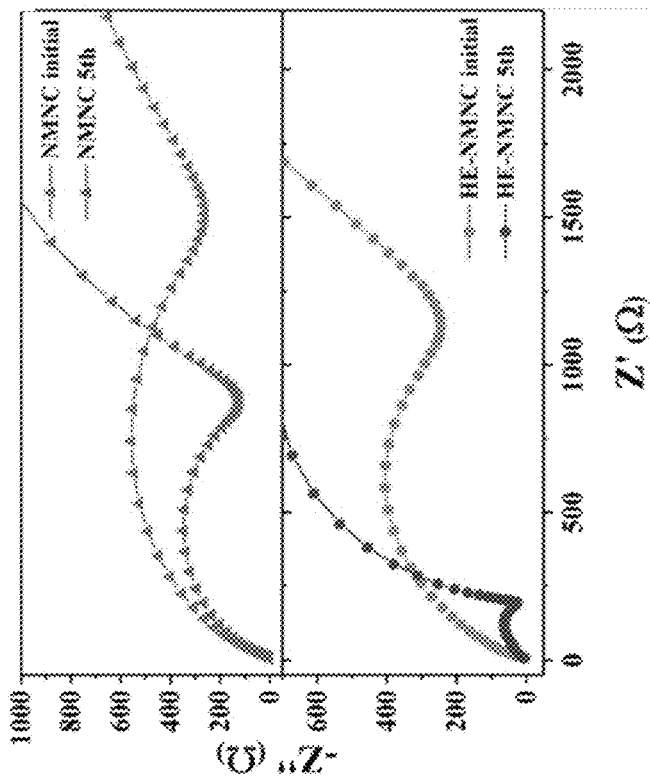

FIG. 20A-20B displays the EIS results of cathodes at different cycles. After the electrochemical activation process, both NMNC and HE-NMNC exhibit significantly decreased interface charge transfer resistances (Rct) in the 5th cycle. Additionally, the Rct values of HE-NMNC are smaller than those of NMNC, which reconfirms the fast reaction kinetics of HE-NMNC.

The electronic structure of O K-edge and TM L-edge are probed by soft XAS, which delivers excellent surface depth sensitivities by tuning detection modes. Total fluorescence yield (TFY) mode can probe the bulk of materials with a depth of ~50 nm, while total electron yield (TEY) mode delivers a probing depth of 2-5 nm.

Figure 6B:
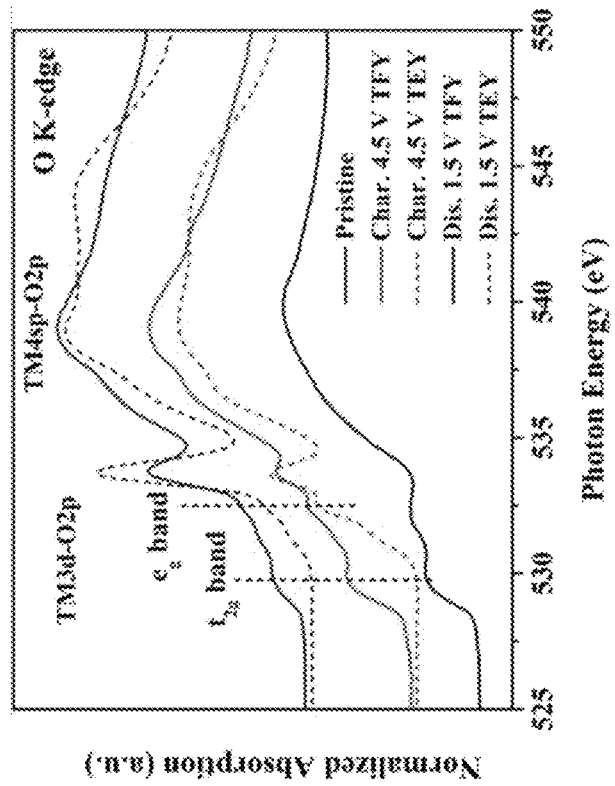
FIGS. 6A-6B show the Ex-situ soft XAS spectra of HE-NMNC at various (dis-) charge states, (FIG. 6A) Ni L-edge, (FIG. 6B) O K-edge.
Figure 6A:
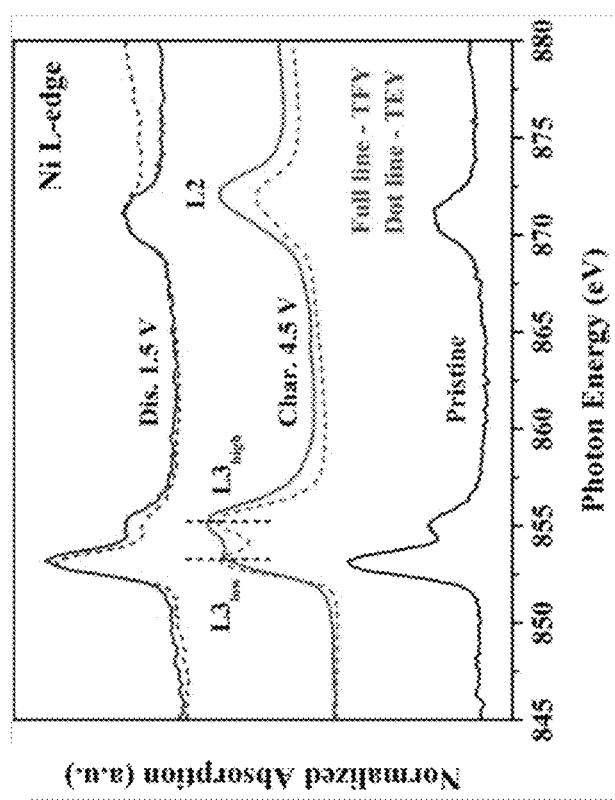

FIG. 6A displays the Ni L-edge XAS results of HE-NMNC at different (dis-) charge states. The L-edge of 3d TM elements can be divided into L3-edge and L2-edge, corresponding to the 2p1/2 to 3d transition and 2p3/2 to 3d transition, respectively. The intensities of L-edge are very sensitive to oxidation state, bond covalence and spin state. The L3-edge can be further deconvoluted into low-energy (L3low) and high-energy (L3high) signals, and the L3high: L3low integrated peak ratio is positively related to TM oxidation states. The pristine Ni L-edge reveals a weak L3high signals and divalent state, in agreement with the previous reports. After fully charged to 4.5 V, the L3high: L3low ratio in FY mode significantly increased, implying the oxidation of Ni in bulk particles upon charging. Notably, the L3high:L3low ratio at fully charged states in TEY mode is lower than that in TFY mode, indicating a lower Ni valence on the surface of active materials. After discharged to 1.5 V, the Ni L-edge spectra recovers back to that of pristine state, corresponding to the reduction of Ni upon discharging.

The normalized O K-edge XAS results of HE-NMNC are shown in FIG. 6C. The O K-edge spectra peaks below 535 eV (pre-edge) correspond to electronic transitions from O 1s to O 2p-TM 3d hybridized states, and the broad peaks above 535 eV (post-edge) are associated with transition to O 2p-TM 4sp states. Generally, the integrated pre-edge intensity represents the average hole state distribution and effective charge on oxygen anions, as the density of empty bound state is concerned in the hybridization of the O 2p-TM 3d orbitals. Pre-edge peaks at around 529.8, 532.2 and 540 eV are further assigned to t2g band, e.g. band and carbonaceous components (sodium oxides) exist on the active material surface, respectively.

Upon charging to 4.5 V, the intensities of the pre-edge peaks in TFY mode significantly increase, as Ni oxidation creates more holes in the O 2p-TM 3d orbitals. Additionally, the weak pre-edge peaks in TFY mode illustrate that the 2p-3d orbitals on cathode materials have more electrons, especially in the t2g orbital. It indicates the TM ions possess a lower valence state at the surface, which is consistent with the Ni TFY and TEY results. The intensities of O pre-edge peaks almost shift back to the pristine state, indicating the reversible structural variations of lattice oxygen. The bulk to surface gradient valence distribution and reversible variation of lattice oxygen are crucial for the excess capacity of HE-NMNC, which is comparable to the reaction mechanism of Li-excess LIB cathodes.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A composition used in a cathode for a sodium ion battery, the composition represented by a formula $Na_aMn_bNi_cCo_dTi_eMg_fMo_gNb_hCu_iO_j$, wherein
a ranges from about 0.6 to 0.7,
b ranges from about 0.6 to 0.7,
c ranges from about 0.1 to 0.2,
d ranges from about 0.10 to 0.15,
e ranges from about 0.005 to 0.02,
f ranges from about 0.005 to 0.02,
g ranges from about 0.005 to 0.02,
h ranges from about 0.005 to 0.02,
i ranges from about 0.005 to 0.02, and
j ranges from about 1.9 to 2.1.

2. The composition of claim 1, wherein the composition has a formula $Na_{0.667}Mn_{0.666}Ni_{0.167}Co_{0.107}Ti_{0.01}Mg_{0.01}Mo_{0.01}Nb_{0.01}Cu_{0.01}O_2$.

3. The composition of claim 1, wherein at a low C-rate, the discharge capacity reaches 195 mhA/g.

4. The composition of claim 1, wherein at a high C-rate, the discharge capacity reaches 180 mhA/g.

5. The composition of claim 1, wherein at a C-rate of 5 C, the composition has a capacity retention that reaches 120 mhA/g.

6. The composition of claim 1, wherein the composition has slow capacity fading.

7. The composition of claim 1, wherein the composition has slow impedance development.

* * * * *